United States Patent
Bisht et al.

(10) Patent No.: US 12,495,082 B2
(45) Date of Patent: Dec. 9, 2025

(54) SYSTEM AND METHOD FOR FACILITATING CONCURRENT COMMUNICATION

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Abhay Kumar, Mumbai (IN); Srikanth Reddy, Peddapur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,453

(22) PCT Filed: Mar. 17, 2023

(86) PCT No.: PCT/IB2023/052631
§ 371 (c)(1),
(2) Date: Mar. 31, 2023

(87) PCT Pub. No.: WO2023/187540
PCT Pub. Date: Oct. 5, 2023

(65) Prior Publication Data
US 2025/0016215 A1    Jan. 9, 2025

(30) Foreign Application Priority Data
Mar. 30, 2022 (IN) .............................. 202221018953

(51) Int. Cl.
*H04L 65/403* (2022.01)
*H04L 12/18* (2006.01)
*H04L 65/1016* (2022.01)

(52) U.S. Cl.
CPC ........ *H04L 65/403* (2013.01); *H04L 12/1818* (2013.01); *H04L 65/1016* (2013.01)

(58) Field of Classification Search
CPC .................. H04L 65/403; H04L 12/1818; H04L 65/1016
(Continued)

(56) References Cited

U.S. PATENT DOCUMENTS 9,179,007 B1 * 11/2015 Yadav ................. H04L 41/0893
9,893,902 B2    2/2018 Vander Mey et al.
(Continued)

FOREIGN PATENT DOCUMENTS

EP            2715972 B1    2/2016
KR      20120085688 A    8/2012

OTHER PUBLICATIONS

A. Hernandez, E. Vazquez, P. Capelastegui and F. Gonzalez, "Lightweight Conferencing Enabler for Multiparty Applications in the IMS," 2009 Third International Conference on Next Generation Mobile Applications, Services and Technologies, Cardiff, UK, 2009, pp. 9-14 (Year: 2009).*

(Continued)

*Primary Examiner* — Taylor A Elfervig
(74) *Attorney, Agent, or Firm* — FINNEGAN, HENDERSON, FARABOW, GARRETT & DUNNER LLP

(57) ABSTRACT

The present disclosure provides a system and a method to facilitate concurrent communication between a user device and a plurality of participating entities. The system may include a network device, which may be associated with a service provider that provides a network service to the user device. The network device may be communicably operational with an external server, where the external server may enable to perform authentication of the user device. The network device may receive input information from the user (Continued)

device, based on which the network device may enable establishing the concurrent communication with the plurality of participating entities. The concurrent communication thus established may not require to sequentially add the participating entities as otherwise required in conventional applications. This may reduce conference establishing time considerably and may also enable to optimize the effective usage of communication time.

30 Claims, 25 Drawing Sheets

(58) Field of Classification Search
USPC .......................................................... 709/204
See application file for complete search history.

(56) References Cited

U.S. PATENT DOCUMENTS

| | | | | |
|---|---|---|---|---|
| 2010/0246571 A1* | 9/2010 | Geppert | ................ | H04L 65/403 370/352 |
| 2010/0246800 A1 | 9/2010 | Geppert et al. | | |
| 2014/0226535 A1 | 8/2014 | Forsberg et al. | | |
| 2015/0172333 A1 | 6/2015 | Lindstrom et al. | | |
| 2017/0265058 A1* | 9/2017 | Sahu | ..................... | H04W 76/16 |
| 2018/0110088 A1* | 4/2018 | Zhu | ....................... | H04W 76/15 |
| 2021/0297461 A1* | 9/2021 | Athwal | .................. | G06Q 20/22 |

OTHER PUBLICATIONS

A. Sanchez-Esguevillas, B. Carro, G. Camarillo, Y.-B. Lin, M. A. García-Martín and L. Hanzo, "IMS: The New Generation of Internet-Protocol-Based Multimedia Services," in Proceedings of the IEEE, vol. 101, No. 8, pp. 1860-1881, Aug. 2013 (Year: 2013).*

R. Liscano, A. Dersingh, A. G. Jost and H. Hu, "Discovering and Managing Access to Private Services in Collaborative Sessions," in IEEE Transactions on Systems, Man, and Cybernetics—Part A: Systems and Humans, vol. 36, No. 6, pp. 1086-1097, Nov. 2006 (Year: 2006).*

ETSI TS 124 147, "Conferencing using the IP Multimedia (IM) Core Network (CN) subsystem; Stage 3", (3GPP TS 24.147 version 14.0.0 Release 14), 650 Route des Lucioles F-06921 Sophia Antipolis Cedex—France, Mar. 2017, Total pp. 211.

International Search Report, PCT/IB2023/052631, mailed Jun. 26, 2023, Total pp. 03.

* cited by examiner

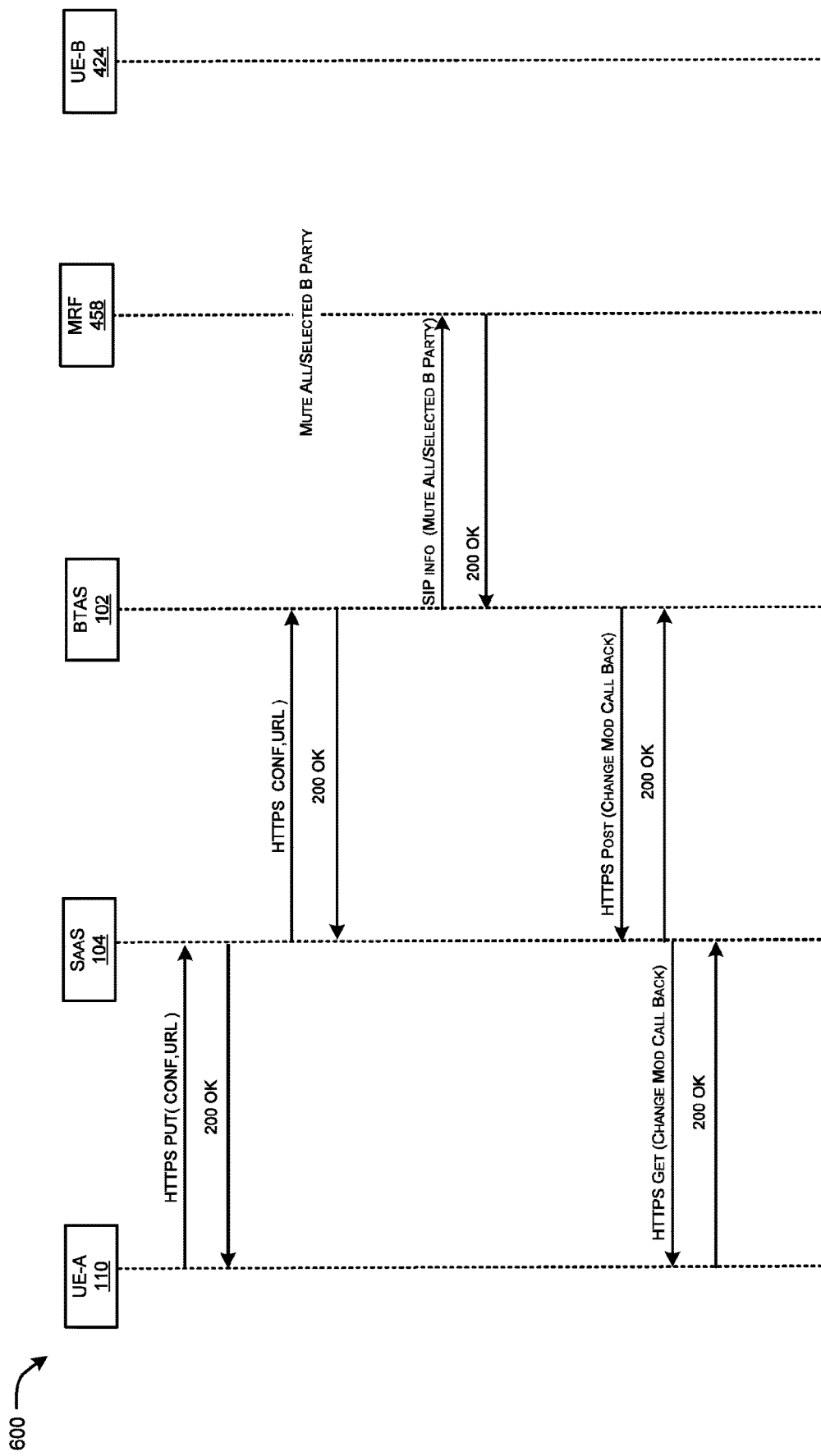

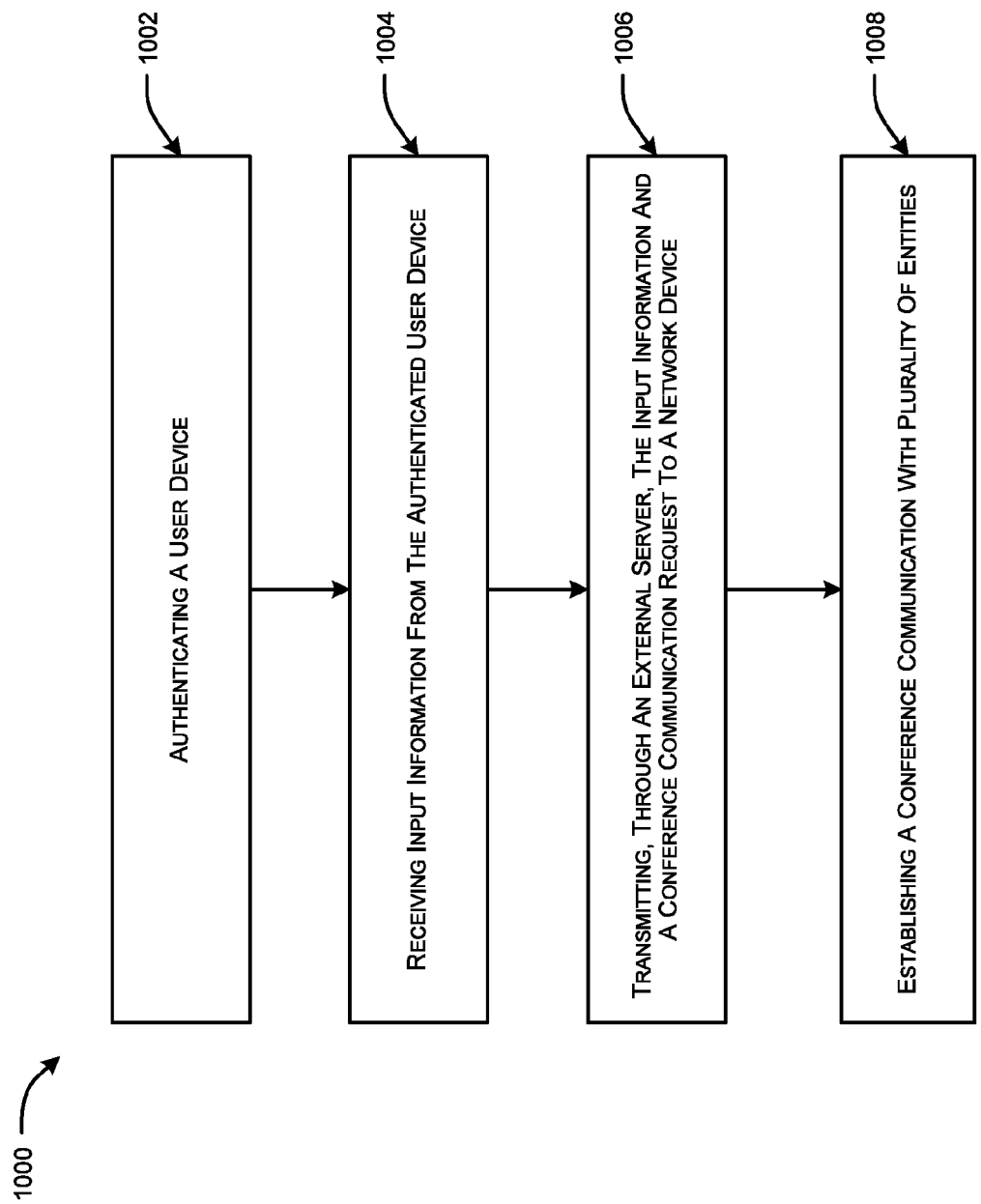

SYSTEM AND METHOD FOR FACILITATING CONCURRENT COMMUNICATION

FIELD OF INVENTION

The embodiments of the present disclosure relates generally to network devices, and more particularly to next generation network devices to enable effective and concurrent communication with multiple participating entities.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Device based communication has become extremely crucial for personal and professional use with an ever increasing need for improved and faster communication services. This may cover various types of communication executed over mobile devices/landline devices such as, for example, communication call including video call, audio call or their combinations. The device based communication enables users to conveniently interact with anyone located even at far or remote areas in the world.

Although one-to-one communication may be commonly used and many existing systems may support the corresponding services, however, the existing systems may not be very effective in case of concurrent communication. For example, to establish a conference call, a user may need to separately contact and add each participating entity to the conference call. This may not only lead to inconvenience of the user but may also consume lots of time and efforts in establishing the concurrent communication. Further, most of the known solutions for one to many conference communication mandatorily require other participants to install a specific conference application/utility software in their respective devices in order to enable their participation in the conference call. Due to this typical dependency of making conference calls, the mass usage potential and utility of a particular conference application gets greatly restricted. Furthermore, in some cases, the concurrent communication may not allow user to control aspects or features of the concurrent communication. Furthermore, next generation implementation such as fifth generation (5G) network may not be adequately explored to support such services, thus limiting their potential as a result.

There is, therefore, a requirement in the art for an effective and economical system and method that can overcome aforementioned problems in the art and can effectively enable a faster, effective and next generation based service for facilitating concurrent communication with plurality of participating entities.

OBJECTS OF THE PRESENT DISCLOSURE

Some of the objects of the present disclosure, which at least one embodiment herein satisfies are as listed herein below.

It is an object of the present disclosure to facilitate an effective, concurrent and improved communication with multiple participating entities.

It is an object of the present disclosure to facilitate an economical and next generation based system and a method that can eliminate the need for sequentially adding each participating entity in a concurrent communication, thus making the process less tedious and more user-friendly.

It is an object of the present disclosure to facilitate a system and a method that can enable an instant communication with multiple contacts irrespective of the location of the user and/or participating entity.

It is an object of the present disclosure to provide multi user, multi network based communication system.

It is an object of the present invention to track the participant status in between the ongoing call.

It is an object of the present invention to provide a facility to enable addition or removal of participants from the ongoing conference call.

It is an object of the present invention to facilitate the conversion of conference call into various other modes, such as lecture mode.

SUMMARY

This section is provided to introduce certain objects and aspects of the present invention in a simplified form that are further described below in the detailed description. This summary is not intended to identify the key features or the scope of the claimed subject matter.

In an aspect, the present disclosure relates to a system for facilitating a user device to establish communication with a plurality of participating entities. The system may include a network device associated with a service provider that provides a network service to the user device. The network device may be communicatively coupled to the plurality of participating entities and may include one or more processors coupled with a memory that may store instructions which when executed by the one or more processors causes the system to receive, through an Internet Protocol Multimedia Subsystem (IMS) server communicably operational with a server associated with the network device, a routed request that may be derived based on an original request received from the user device The original request may indicate a requirement to establish a conference communication with the plurality of participating entities. The system may be configured to extract, based on the received routed request, a first set of attributes pertaining to a list of pre-stored contact numbers pertaining to the plurality of participating entities. The system may be configured to extract, based on the received routed request, a second set of attributes pertaining to a combination of an input information and one or more desired actions to be implemented associated with the input information and thereby invoke, based on the extracted first and second set of attributes, a call leg to initiate a concurrent communication with the plurality of participating entities. Based on the invoked call leg, the IMS server may establish the concurrent communication of the user device with the plurality of participating entities.

In an embodiment, a user may be able to access a set of executable instructions that is installed in the user device to enable the user device to send any or a combination of the input information and the original request through a pre-defined medium.

In an embodiment, the system may be configured to authenticate the user device through the server prior to receiving any or a combination of the input information and the original request.

In an embodiment, the system may be configured to establish the concurrent communication between the user device and the plurality of participating entities simultaneously to avoid sequential establishment of the concurrent communication.

In an embodiment, the system may be configured to enable a user to customize one or more features of the concurrent communication, the one or more features including any or a combination of addition or removal of one or more participating entities, muting or unmuting the one or more participating entities, creating or scheduling ad-hoc communication, and obtaining status of each of the one or more participating entities in the concurrent communication.

In an embodiment, the system may be configured to obtain a status of a plurality of entity devices corresponding to the subscribed plurality of participating entities prior to the initiation of the concurrent communication. The status of the plurality of entity devices corresponding to the subscribed plurality of participating entities may be indicative of availability of the subscribed plurality of participating entities prior to the initiation of the concurrent communication.

In an embodiment, one or more of participating entities of the plurality of participating entities may be associated with a different service provider. In an embodiment, the system may be configured to establish the concurrent communication with the one or more participating entities associated with the different service provider.

In an embodiment, the system may be configured to establish a communication between the user device and a single entity.

In an embodiment, the system may be configured to establish the concurrent communication in case of any or a combination of a scheduled communication or a dynamic call. The scheduled communication may pertain to a communication scheduled in advance and the dynamic call may pertain to randomly established communication without prior planning.

In an embodiment, the system may be configured to connect the user device with respective entity devices of the plurality of participating entities through a conference communication call including at least one of an audio call, a video call, or combination thereof.

In an embodiment, the system may be configured to facilitate the concurrent communication through exchange of communication data including at least one of a textual data, a video data, and an audio data.

In an embodiment, the network device may be configured to send a status notification to the set of executable instructions on the user device via the server.

In an embodiment, the network device may be configured to handle functions pertaining to service charging.

In an aspect, the present disclosure relates to a user equipment (UE) for establishing communication with a plurality of participating entities. The UE may include a processor associated with a service provider that provides a network service to the UE. The UE may be communicatively coupled to the plurality of participating entities. The processor may be coupled with a memory that stores instructions which when executed by the processor may cause the UE to initiate a concurrent communication with the plurality of participating entities by sending an original request, where the original request indicates a requirement to establish a conference communication with the plurality of participating entities. The processor may further cause the UE to receive, in response to the initiation of the concurrent communication, through an Internet Protocol Multimedia Subsystem (IMS) server communicably operational with a server associated with the UE, a routed request that may be derived based on the original request from the UE. The UE may be configured to extract, based on the received routed request, a first set of attributes pertaining to a list of pre-stored contact numbers pertaining to the plurality of participating entities and then extract, based on the received routed request, a second set of attributes pertaining to a combination of an input information and one or more desired actions to be implemented associated with the input information. The UE may be configured to invoke, based on the extracted first and second set of attributes, a call leg to initiate the concurrent communication with the plurality of participating entities and based on the invoked call leg, the IMS server may establish the concurrent communication of the UE with the plurality of participating entities.

In an embodiment, the concurrent communication may be initiated by using a set of executable instructions on the UE.

In an embodiment, the set of executable instructions on the UE may be used to send a conference communication request along with the input information to the server which may be forwarded to the UE for establishing the concurrent communication.

In an aspect, the present disclosure relates to a method for facilitating a user device to establish communication with a plurality of participating entities. The method may include the steps of receiving, by a network device, through an Internet Protocol Multimedia Subsystem (IMS) server communicably operational with a server associated with the network device, a routed request that may be derived based on an original request from the user device. The original request may indicate a requirement to establish a conference communication with the plurality of participating entities. The network device may be associated with a service provider that provides a network service to the user device and may be communicatively coupled to the plurality of participating entities. The network device may include one or more processors coupled with a memory, where the memory stores instructions executed by the one or more processors. The method may include the step of extracting, by the network device, based on the received routed request, a first set of attributes pertaining to a list of pre-stored contact numbers pertaining to the plurality of participating entities and the step of extracting, by the network device, based on the received routed request, a second set of attributes pertaining to a combination of an input information and one or more desired actions to be implemented associated with the input information. The method may include the step of invoking, by the network device, based on the extracted first and second set of attributes, a call legto initiate a concurrent communication with the respective plurality of participating entities and based on the invoked call leg, the IMS server may establish the concurrent communication of the user device with the plurality of participating entities.

In an aspect, the present disclosure relates to a non-transitory computer readable medium including machine executable instructions that are executable by a processor to receive, through an Internet Protocol Multimedia Subsystem (IMS) server communicably operational with a server associated with a network device that may be operatively coupled to the non-transitory computer readable medium, a routed request that is derived based on an original request from a user device. The original request may indicate a requirement to establish a conference communication with a plurality of participating entities. The network device may be associated with a service provider that provides a network service to the user device and may be communicatively coupled to the plurality of participating entities. The processor may be configured to extract, based on the received routed request, a first set of attributes pertaining to a list of pre-stored contact numbers pertaining to the plurality of participating entities. The processor may be configured to extract, based on the received routed request, a second set of attributes pertaining to a combination of an input information and one or more desired actions to be implemented associated with the input information and thereby invoke, based on the extracted first and second set of attributes, a call leg to initiate a concurrent communication with the respective plurality of participating entities. Based on the invoked call leg, the IMS server may establish the concurrent communication of the user device with the plurality of participating entities.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 6 illustrates exemplary representation showing steps pertaining to converting a concurrent communication to a lecture mode, in accordance with an embodiment of the present disclosure.

FIG. 10 illustrates an exemplary representation of flow diagram for facilitating a user device to establish concurrent communication with plurality of participating entities, in accordance with an embodiment of the present disclosure.

Figure 1A:
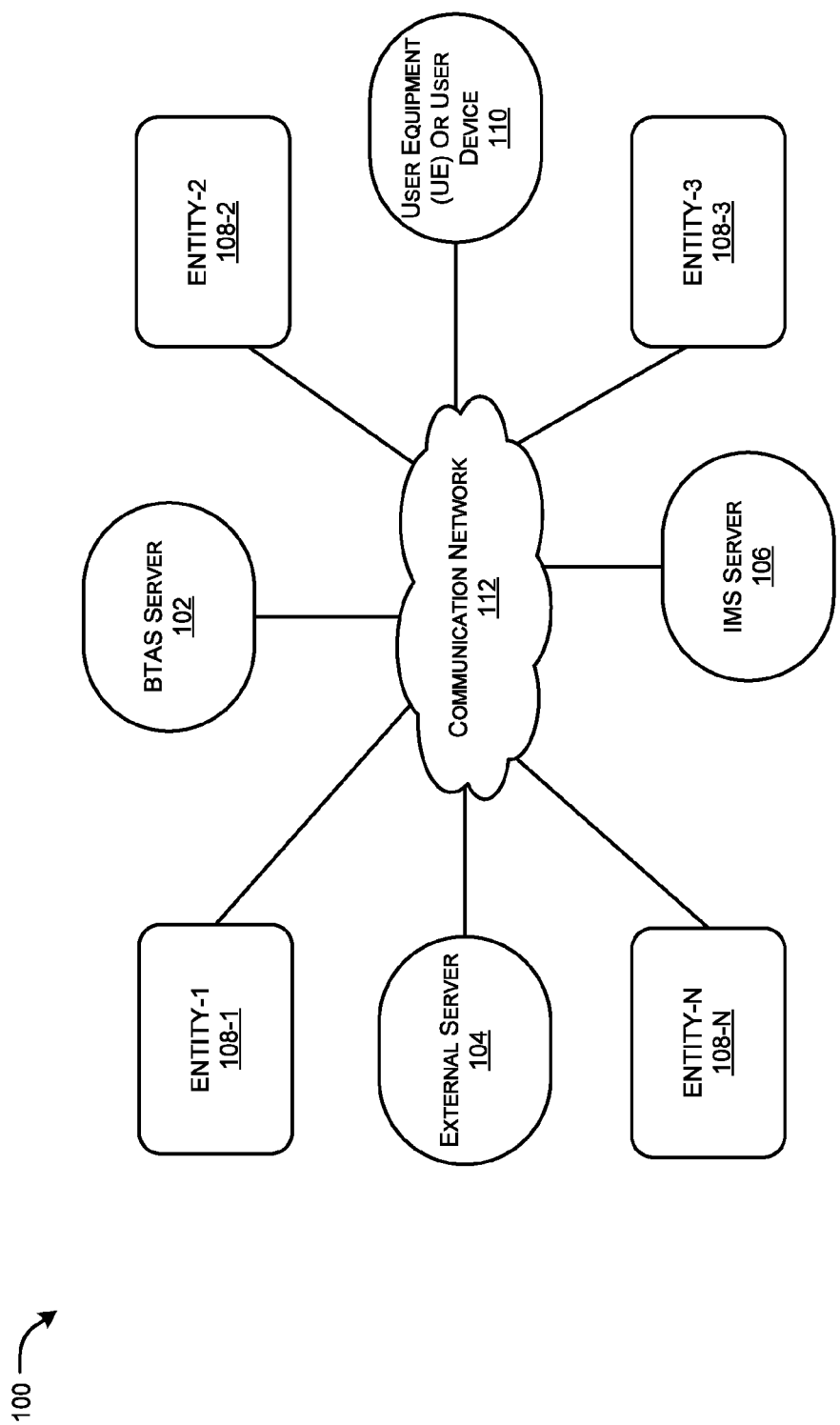
FIGS. 1A-1B illustrate exemplary network architecture in which or with which system of the present disclosure can be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present system and method facilitate to overcome the above mentioned problems by enabling establishment of an effective and concurrent communication of a user device with multiple entities. For example, a communication may be established between user device and multiple entities simultaneously in a conference communication, without the need to sequentially establish the communication (i.e. one after the other) as done by the conventional systems. This aspect can expedite the communication process thus saving time and facilitating an enhanced user experience as a result. In addition, the system and method of the present disclosure may also enable a user to customize one or more features of the concurrent communication such as, for example, addition or removal of the participating entities, muting or unmuting the participating entities, create or schedule ad-hoc communication, obtaining status of each participating entity in the communication and other such features. Various other embodiments/advantages may be possible and may be clear from the description hereinbelow.

The present disclosure may include a system and a method for facilitating a user device to establish concurrent communication (also interchangeably referred to as group communication) with a plurality of participating entities (also referred to as plurality of entities, multiple entities or multiple participating entities). In an aspect, the present disclosure may disclose a system for establishing the concurrent communication. The system may include a network device, which may be associated with a service provider that provides a network service to the user device. In an embodiment, an external server as may be communicably operational with a server associated with the network device (network device hereinafter interchangeably referred to as Business Telephony Application Server or BTAS). In an example embodiment, the external server may pertain to a gateway such as, for example, Software as a service (SAAS) gateway. The plurality of participating entities may include, but not limiting to, an individual, a group of individuals, an organization or any other entity participating in the concurrent communication through corresponding entity devices. In an embodiment, the plurality of participating entities may or may not be necessarily subscribed to the service provider facilitating the concurrent communication and may be associated with a different service/service provider. In an example embodiment, when one or more of the plurality of participating entities may also be subscribed to the same service provider (as the user) then the system may also allow to obtain the status of entity devices corresponding to the subscribed plurality of participating entities prior to the initiation of the communication. This feature may enable to save time and efforts of the user as the user may be able to know availability of the subscribed participating entities prior to initiation of the call. Various other aspects may also be possible within the scope of the present disclosure. It may be appreciated that even if the present disclosure mainly covers concurrent communication or conference communication that may be defined with respect to multiple participating entities, however, the present system and method may also be useful in establishing communication between user and a single participating entity without departing from the scope of the present disclosure. Further, the system may also be able to establish concurrent communication in case of a scheduled communication or a dynamic call, wherein the scheduled communication may pertain to a communication scheduled in advance whereas the dynamic communication may pertain to randomly established communication without prior planning. Various other aspects may be possible within the scope of the present disclosure.

In an embodiment, the user may use the user device to send a conference communication request and/or an input information to the external server. The conference communication request (also interchangeably referred to as communication request) may pertain to a request by user indicating a need to establish the concurrent communication. In an example embodiment, the input information may include, but not limited to, a list of multiple participating entities, a list of pre-stored contact numbers pertaining to the participating entities, one or desired actions to be implemented, such as, for example, muting/unmuting the participants, and other such associated information. In an example embodiment, the user may be able to access a set of executable instructions (such as an application) that may be installed in the user device so as to enable the user device to send the input information and/or communication request through medium such as, for example, Hypertext Transfer Protocol Secure (HTTPS) message to the external server or SAAS gateway. Various other types of information may be present in the input information.

In an example embodiment, the network device may include one or more processors coupled with a memory. The memory may store instructions which when executed by the one or more processors may cause the system to perform one or more functions pertaining to the concurrent communication. For example, based on the conference communication request and the input information, the network device may facilitate establishing the concurrent communication of the user device with the plurality of participating entities. In an embodiment, the network device may establish the concurrent communication by communicably interacting with an Internet Protocol Multimedia Subsystem (IMS) server. In an embodiment, prior to receiving the communication request and/or the input information, the user device may be authenticated, for example, through the external server. Various other aspects may be possible within the scope of the present disclosure.

Figure 1B:
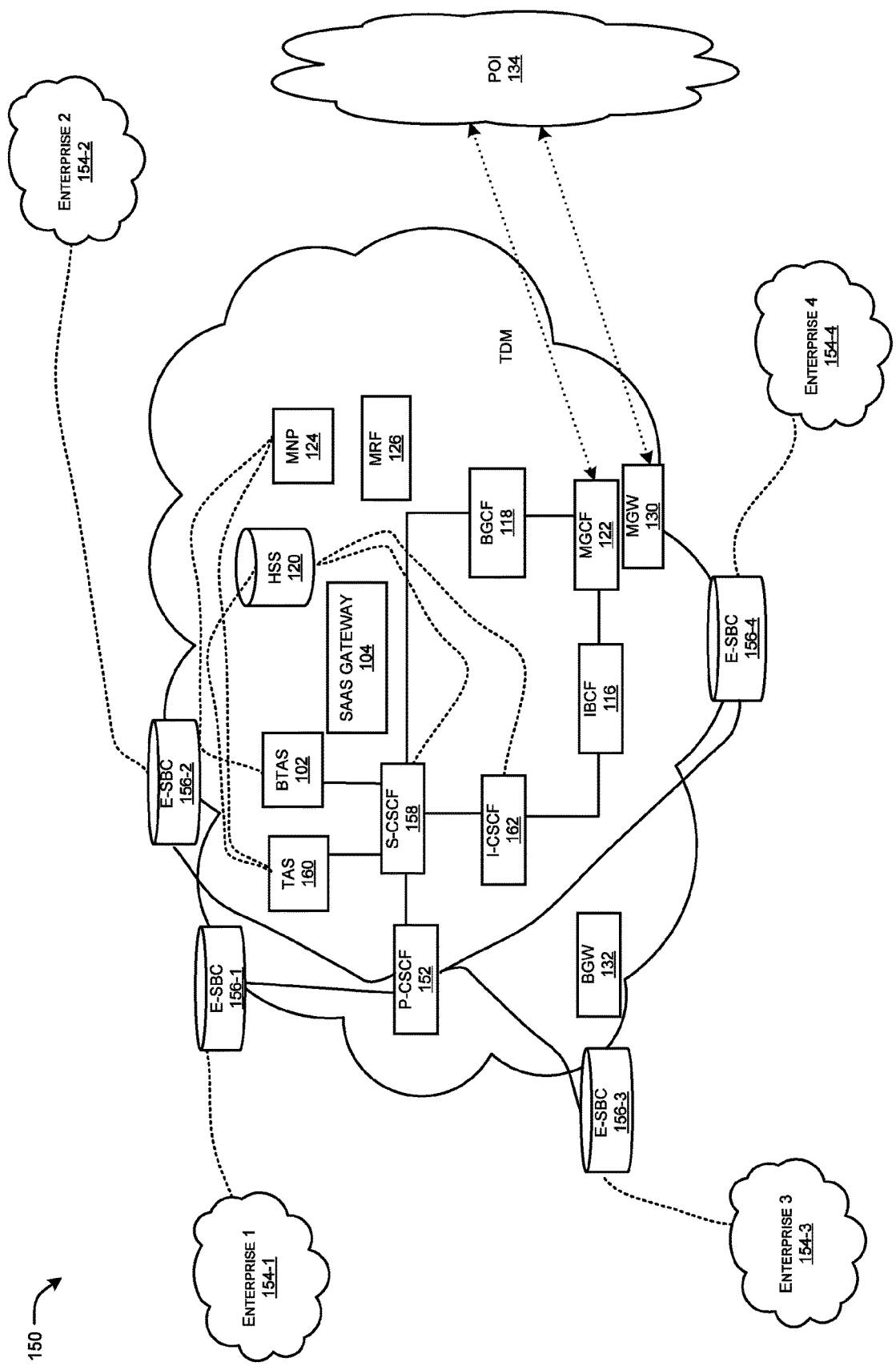

FIGS. 1A-1B illustrate exemplary network architecture 100 and 150 in which or with which system of the present disclosure can be implemented, in accordance with an embodiment of the present disclosure. As illustrated in representation 100 in FIG. 1A, a network device 102 (network device hereinafter interchangeably referred to as Business Telephony Application Server or BTAS 102) may be configured to facilitate a user device 110 to establish concurrent communication with a plurality of participating entities (108). The network device 102 may be configured as an application server and may be communicably operational or may be integrated with the Internet Protocol Multimedia Subsystem (IMS) server 106 (also interchangeably referred to as IMS or IMS core) and an external server 104 (also referred to as SAAS gateway 104 in FIG. 1B). The IMS server 106 may pertain to a vendor or service provider to enable a user device 110 (also referred to as the user equipment (UE) herein to establish the concurrent communication with the plurality of participating entities. In an embodiment, the BTAS or the network device 102 may be implemented in an existing IMS implementation to facilitate network service corresponding to communication network 112. In an example, the communication network 112 may pertain to, for example, fifth generation (5G) network service or sixth generation (6G) network service. In an embodiment, the network device 102 may be communicably operational with a Centralized Data Layer (CDL) server or framework 104 (not shown) that may enable to access information stored across different physical hosts in multiple or different circles/cluster for enabling other aspects or features pertaining to concurrent communication with the participating entities.

The user device 110 (also interchangeably referred to as a user equipment or UE or terminal 110) may include, but not limited to, a mobile device that may include, for example, cellular telephone, such as a feature phone, a Voice over Long Term Evolution (VOLTE) device, smartphone and other devices. The user device may not be limited to the above mentioned devices, but may include any type of device capable of communication, such as a cellular phone, a tablet computer, a personal digital assistant (PDA), a personal computer (PC), a laptop computer, a media centre, a work station and other such devices. In an embodiment, the user device may be subscribed or registered to the network service provided by the service provider. In an example embodiment, the network service may pertain to a fifth generation (5G) network, wherein the service provider may provide the network service corresponding to at least one of one of a cellular network service, a private network service, a satellite network service or a convergence network service.

In an embodiment, the communication network 112 pertaining to BTAS based IMS implementation may be a 5G network that may include at least one of a wireless network, a wired network or a combination thereof. The communication network 112 may be implemented as one of the different types of networks, such as Intranet, Local Area Network (LAN), Wide Area Network (WAN), Internet, and the like. Further, the network can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the communication network 112 may pertain to a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. In an example embodiment, the communication network may enable 5G network based on subscription pertaining to the user/user device and/or through a Subscriber Identity Module (SIM) card. Various other types of communication network or service may be possible.

In an example, the communication network 112 may utilize different sort of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

In an example embodiment, the concurrent communication may facilitate to connect the user device with respective devices of the participating entities through a conference communication call comprising at least one of an audio call, a video call or combination thereof. In an embodiment, the concurrent communication may be facilitated through exchange of communication data comprising at least one of a textual data, a video data and an audio data. Various other types of communication or types of communication data may be possible within the scope of the present disclosure.

In an embodiment, the concurrent communication (also referred to as group communication) may be established in form of, for example, a conference communication call. In an embodiment, the concurrent communication may be initiated by using an executable set of instructions (application) on the user device 110 through the network service provided through the communication network 112. The network service may be supported by the network device 102 in association with the external server 104 (SAAS gateway) and the IMS server 106. In an embodiment, the application in the user device 110 may be used to send a conference communication request along with input information to the external server 104, which may be further forwarded to the network device or BTAS 102 for establishing the concurrent communication. For example, the BTAS 102 may handle list of participating entities, may initiate the communication with each of the participating entities (108) and may merge the communication with the user device 110. In another example, the network device or BTAS 102 may also enable to send status notification to application on user device via the external server (or SAAS gateway) 104. In another example, the network device or BTAS 102 may handle conference participant list and/or status notification via Representational State Transfer or RESTful interface received via the SAAS gateway. In yet another example, the network device or BTAS 102 may also handle functions pertaining to service charging. Various other embodiments may be possible within the scope of the present disclosure.

In reference to FIG. 1B, the network service (corresponding to 112 in FIG. 1A) may be provided to multiple entities or enterprises, such as, for example, enterprise-1 (154-1), enterprise-2 (154-2), enterprise-3 (154-3), and enterprise-4 (154-4) (collectively termed as enterprise 154). In an embodiment, at least one of the enterprises 154 may include an IP private branch exchange (IP-PBX) (not shown) to enable switching calls between user devices 110 on local lines, wherein each enterprise 154 may communicate with the communication network/servers through an enterprise session border controllers (E-SBC). As shown in FIG. 1B, each enterprise, for example, enterprise-1 (154-1), enterprise-2 (154-2), enterprise-3 (154-3), and enterprise-4 (154-4) may be facilitated with the network service (such as 5G network service) through E-SBC 156-1, 156-2, 156-3 and 156-4 respectively. The E-SBC 156 may be an executable set of instructions for enabling connectivity and security pertaining to network of the enterprises and service providers. The IP-PBX may be a private branch exchange or a telephone switching system within an enterprise, which may enable, for example, switching calls between users within an enterprise. In an embodiment, the BTAS 102 may be communicably coupled with other components, such as, for example, IP Telephone and provisioning servers. In an example embodiment, the IP-PBX may communicate with the E-SBC 154 via session initiation protocol (SIP) technique. The enterprise may pertain to an entity (108) including, but not limited to, an organization, a company, a business, an educational campus, an office campus, a shopping centre, a residential area/community and various other entities that may wish to avail the communication network by the service provider to enable concurrent communication. Various other types of entities/provisions are possible.

The IMS server (106 of FIG. 1A) may include one or more modules or components that may enable to perform one or more functions. For example, the IMS server may be an existing IMS core including components/modules handling various functions such as, serving-call session control function (S-CSCF) module 158, interrogating call session control function (I-CSCF) module 162, proxy-call session control function (P-CSCF) module 152. In an embodiment, the BTAS 102 may be integrated with a network of the IMS core and other application servers to provide a network service pertaining to, for example, a fifth generation (5G) network. For example, the other application server may include a telephony application server (TAS) 160, which may be considered as a general component used in a communication network to provide telephony applications and additional multimedia functions. In another example, the other application server may include Mobile number portability (MNP) server 124, which may provide number portability to users such as, for example, may allow retaining same number upon change in service provider. Various other servers may be integrated to the BTAS enabled IMS implementation for enabling one or more services pertaining to communication network or 5G network without departing from the scope of the ongoing description.

In reference to the components pertaining to the IMS, the S-CSCF module 158 may be a primary node in the IMS server responsible for session control. In an embodiment, a list of subscribers may be allocated to respective S-CSCF module 158 at the time of IMS registration in order to facilitate routing of session initiation protocol (SIP) messages as part of service establishment procedures. In operation, the S-CSCF module 158 may enable downloading a subscriber profile from the home subscriber server (HSS) 120 at the time of IMS registration. The I-CSCF module 162 may be a key element in the IMS server and may enable any request to be routed to an appropriate S-CSCF module 158 from multiple S-CSCFs within the network. The I-CSCF module 162 may also interrogate the HSS 120 to obtain an address of the relevant S-CSCF module 158 to process a SIP initiation request. As shown in FIG. 1B, the P-CSCF module 152 may act as an ingress and egress point to and from an IMS domain of the service provider with respect to the IMS client. The P-CSCF module 152 may perform general functions, such as, for example, onward routing of registration and session requests to the correct nodes in the communication network, updating the S-CSCF module 158, maintaining a secure connection with the user device, and other such functions. In an embodiment, the network device or BTAS 102 may be communicably coupled or be integrated with one or more functional components such as, for example, a session initiation protocol (SIP) based application server. The SIP server may be built with features pertaining to the type enterprise 154.

Further, as shown in FIG. 1B, to provide various aspects of the network service (e.g., pertaining to 5G network), the components of IMS server (such as S-CSCF, I-CSCF module) may also include components/modules that pertain to functions, for example, breakout gateway control function (BGCF) module 118, a media gateway control function (MGCF) module 122, interconnect border control function (IBCF) 116 and other components/modules. In general implementation, the BGCF module 118 may enable routing call signalling to and from the most appropriate S-CSCF module 158. In the present implementation, the BGCF module 118 may enable to route the call to respective BTAS 102 for establishing the concurrent communication. In general, the MGCF module 122 may be a SIP endpoint that can interface with security gateway (SGW) and may also control resources in media gateway (MGW) 130. The IBCF module 116 may enable boundary control between various service provider networks, thus providing BTAS enabled IMS network security in terms of signalling information. The IMS server may also include other existing components such as for example a component pertaining to multimedia resource function (MRF) module 126. The MRF module 126 in conjunction with other components of IMS, may be responsible for executing various processing tasks on media streams associated with particular services. Further, as shown in FIG. 1B, as the BTAS-IMS based implementation may be associated with point of interconnection (POI) 134, which may be physical interface between media gateways of varying service providers or enterprises.

Figure 2A:
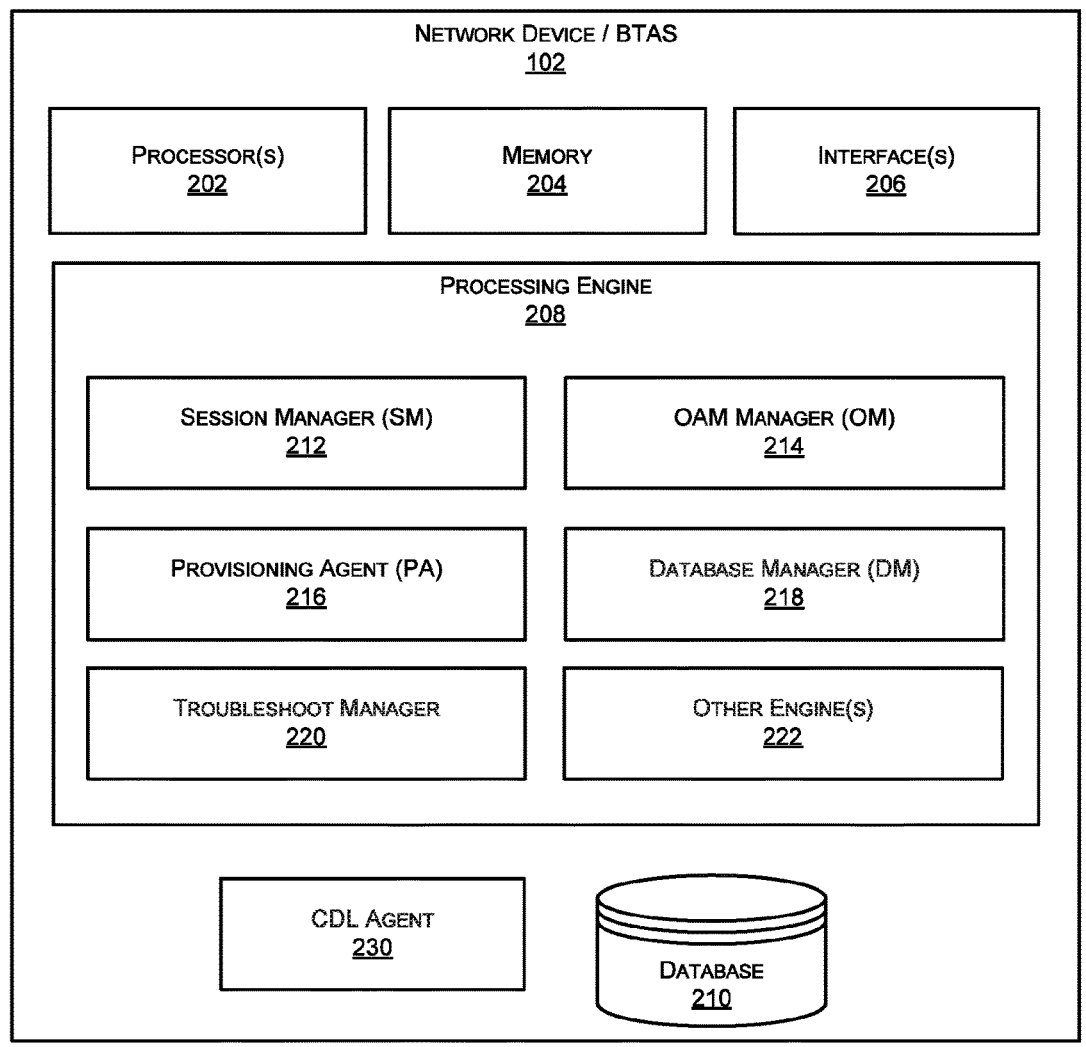
FIG. 2A with reference to FIG. 1A, illustrates an exemplary representation of a network device, in accordance with an embodiment of the present disclosure.

The system may facilitate the concurrent communication by a combination of hardware and software implementation. FIG. 2A with reference to FIG. 1A, illustrates an exemplary representation of a network device, in accordance with an embodiment of the present disclosure. The system includes the network device or BTAS 102 that may include one or more processors. The network device or BTAS 102 may be integrated with IMS server 106 to provide a network service to a user device 110 (as shown in FIG. 1A). In an aspect, the network device 102 may include one or more processor(s) 202 coupled with a memory 204. The memory 204 may store instructions which when executed by the one or more processors may cause the system to perform the steps as described herein. The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 100. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the system 100 may include an interface(s) 206. The interface(s) 206 may comprise a variety of interfaces, for example, interfaces for data input and output devices, referred to as I/O devices, storage devices, and the like. The interface(s) 206 may facilitate communication of the system 100. The interface(s) 206 may also provide a communication pathway for one or more components of the system 100. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 100 may comprise the machine-readable storage medium storing the instructions and the processing resource to execute the instructions, or the machine-readable storage medium may be separate but accessible to the system 100 and the processing resource. In other examples, the processing engine(s) 208 may be implemented by electronic circuitry.

The processing engine 208 of the network device may include one or more components (as shown in FIG. 2A) including session manager (SM) 212, operations and maintenance (OAM) manager 214, provisioning agent 216, database manager (DM) 218 and troubleshooting manager (TM) 220. The SM 212 may act as a core functional delivery module which may be responsible for call processing and service chaining logic execution in case of BTAS. The SM 212 may further include one or more sub-modules such as call initiation module (not shown) for initiating a communication with the plurality of participating entities. The OAM manager 214 may be configured for managing fault, configuration, and performance aspects of the BTAS/network device. The OAM manager 214 may provide operations and maintenance touch point to the system or the BTAS 102. The DM 218 may manage database cluster where BTAS 102 may store subscriber specific service information. In an embodiment, a service data modification request that may be received by the provisioning agent 216 may be stored persistently using DM manager 218. The provisioning agent 218 may be responsible for handling provisioning request received from centralized provisioning server for persisting changes in database 210. The provisioning agent may also ensure that various session managers 212 may be updated about any dynamic changes in the service data. The TM 220 may aggregate logs and may debug information from all the functional managers for trouble shooting. The TM 220 may also provide flexibility to generate debug information, for example, in a module-wise, process-wise, system-wise manner. The other engines 222 may relate to other modules/components that may perform one or more functions. The network device or BTAS 102 may include a CDL agent 230 that may enable interaction with the CDL server 104. Various other functions of the components may be possible. In an embodiment, database 210 may comprise data that may be either stored or generated as a result of functionalities implemented by any of the components of the processing engine(s) 208 of the system 100.

Figure 2B:
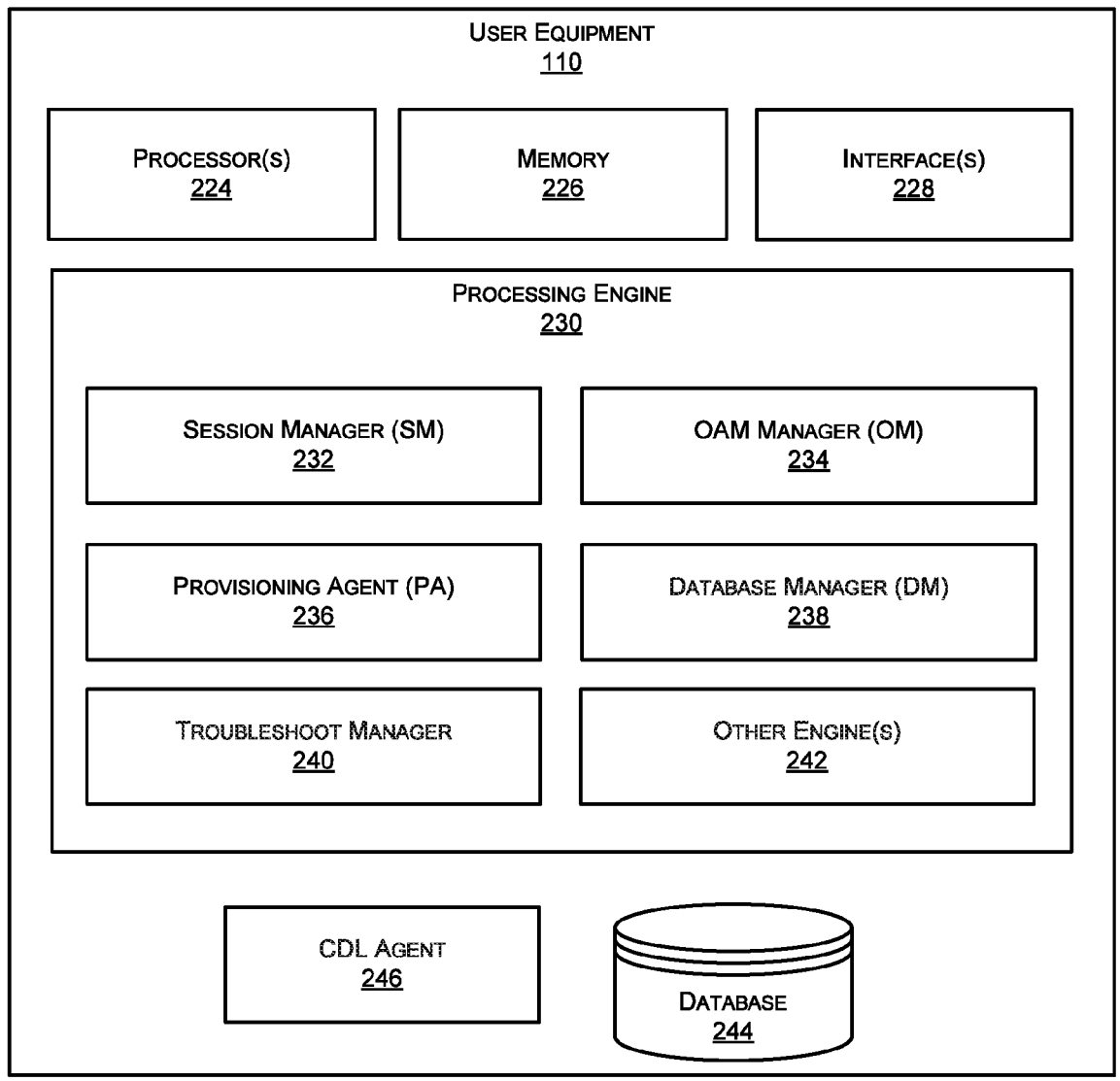
FIG. 2B with reference to FIG. 1A, illustrates an exemplary representation of a user equipment (UE), in accordance with an embodiment of the present disclosure.

FIG. 2B with reference to FIG. 1A, illustrates an exemplary representation of a user equipment (UE), in accordance with an embodiment of the present disclosure. The UE includes a processor 224 and may be implemented as one or more microprocessors, microcomputers, microcontrollers, digital signal processors, central processing units, logic circuitries, and/or any devices that process data based on operational instructions. Among other capabilities, the processor 224 may be configured to fetch and execute computer-readable instructions stored in a memory 226 of the UE (110). The memory 226 may be configured to store one or more computer-readable instructions or routines in a non-transitory computer readable storage medium, which may be fetched and executed to create or share data packets over a network service. The memory 226 may comprise any non-transitory storage device including, for example, volatile memory such as RAM, or non-volatile memory such as EPROM, flash memory, and the like.

In an embodiment, the UE (110) may include an interface(s) 228. The interface(s) 228 may comprise a variety of interfaces, for example, interfaces for data input and output devices, referred to as I/O devices, storage devices, and the like. The interface(s) 228 may facilitate communication of the UE (110). The interface(s) 228 may also provide a communication pathway for one or more components of the UE 110. Examples of such components include, but are not limited to, processing engine(s) 230 and a database 244.

The processing engine(s) 230 may be implemented as a combination of hardware and programming (for example, programmable instructions) to implement one or more functionalities of the processing engine(s) 230. In examples described herein, such combinations of hardware and programming may be implemented in several different ways. For example, the programming for the processing engine(s) 230 may be processor executable instructions stored on a non-transitory machine-readable storage medium and the hardware for the processing engine(s) 230 may comprise a processing resource (for example, one or more processors), to execute such instructions. In the present examples, the machine-readable storage medium may store instructions that, when executed by the processing resource, implement the processing engine(s) 230. In such examples, the UE 110 may comprise the machine-readable storage medium storing the instructions and the processing resource to execute the instructions, or the machine-readable storage medium may be separate but accessible to the UE 110 and the processing resource. In other examples, the processing engine(s) 228 may be implemented by electronic circuitry.

The processing engine 230 may include one or more components (as shown in FIG. 2B) including session manager (SM) 232, operations and maintenance (OAM) manager 234, provisioning agent 236, database manager (DM) 238, troubleshooting manager (TM) 240, and other like engines 242. The SM 232 may act as core functional delivery module which may be responsible for call processing and service chaining logic execution in case of BTAS. The SM 232 may further include sub-modules such as call initiation module (not shown) for initiating a communication with the plurality of emergency services. The OAM manager 234 may be responsible for managing fault, configuration and performance aspects of the UE 110. The OAM manager 234 may provide operations and maintenance touch point to the UE 110. The DM 238 may manage database cluster where BTAS 102 may store subscriber specific service information. In an embodiment, a service data modification request that may be received by the provisioning agent 236 may be stored persistently using DM 238. The provisioning agent 236 may be responsible for handling provisioning request received from centralized provisioning server for persisting changes in database 244. The provisioning agent 236 may also ensure that various session managers 232 may be updated about any dynamic changes in the service data. The TM 240 may aggregate logs and may debug information from all the functional managers for trouble shooting. The TM 240 may also provide flexibility to generate debug information, for example, in a Module wise, process wise, system wise manner. Various other functions of the components may be possible. In an embodiment, database 244 may comprise data that may be either stored or generated as a result of functionalities implemented by any of the components of the processing engine(s) 230 of the UE 110.

Figure 3:
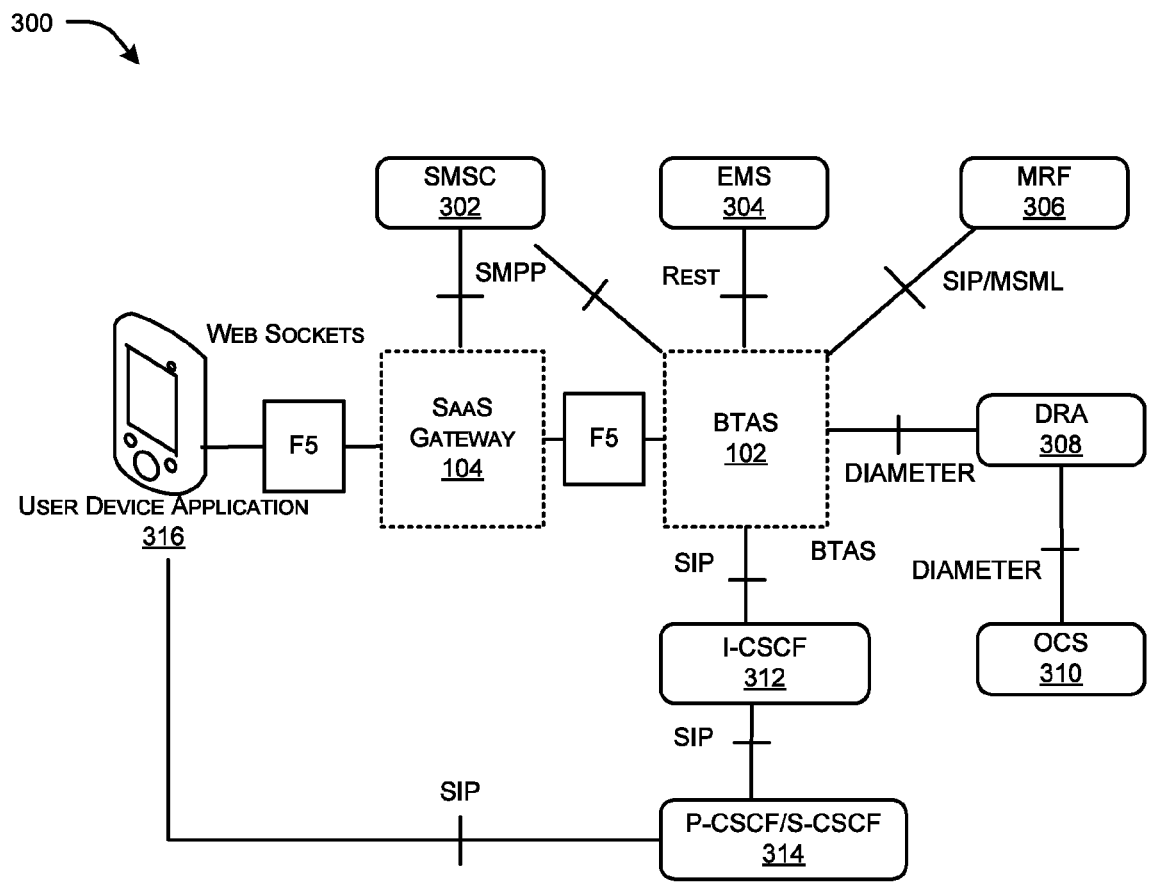
FIG. 3 illustrates exemplary representation showing server architecture of network device or BTAS, in accordance with embodiments of the present disclosure.

FIG. 3 illustrates exemplary representation showing server architecture of network device or BTAS, in accordance with embodiments of the present disclosure. As shown in FIG. 3, the BTAS 102 may be integrated or coupled with various hardware/software components or servers for enabling one or more functions pertaining to communication of the user device with the plurality of participating entities. The BTAS 102 may be integrated with IMS server to enable the communication processing pertaining to a user device in an enterprise (154—as shown in FIG. 1B). In an example embodiment, the BTAS 102 may be integrated with IMS server to establish and control communication connections via network protocol including, but not limited to, session initiation protocol (SIP). As illustrated in FIG. 3, the BTAS 102 may be operational with components of IMS server (106 of FIG. 1A) such as, for example, I-CSCF 312, which may enable communication with appropriate P-CSCF or S-CSCF 314 that may communicate with the user device application 316. In an example, the user device application 316, the components of IMS server and the BTAS 102 may communicate via SIP protocol.

As the communication may also involve use of media in one or more forms, the BTAS 102 may integrate with multimedia resource function (MRF) 306. The BTAS 102 may be independently integrated or coupled with element management system (EMS) 304 via representational state transfer (REST) protocol to enable provisioning of service data. The EMS may include hardware and software implementation for managing the five key aspects i.e. fault, configuration, accounting, performance and security (FCAPS) functionality via representational state transfer (REST) protocol to exchange messages pertaining to the key aspects that can use hypertext transfer protocol (HTTP) to transport the messages. The EMS may provide foundation to implement operations support system (OSS) or business support systems (BSS) based architecture that enable service providers to meet customer needs for example, for rapid deployment of services, to enable providing satisfying quality of service requirements and other such services. In an example embodiment, the BTAS 102 may integrate with MRF 306 to enable functions, such as, for example, media mixing, control of announcement and other such purposes via network protocol including, but not limited to, session initiation protocol media server markup language (SIP-MSML).

Further, as shown in FIG. 3, the BTAS 102 may be integrated or coupled with diameter routing agent (DRA) 308 via diameter protocol, which may be a standard protocol for authentication, authorization and accounting information in the IMS server based network. The DRA 308 may be a functional element that may provide real-time routing capabilities to ensure that messages are routed among the correct elements in a network. The integration of BTAS 102 with the DRA 308 may enable to integration with online charging system (OCS) 310 for facilitating Ro charging. The OCS 310 may be a system that allows a service provider to charge users or customers in real time based on service usage, and wherein the Ro charging pertains to a protocol that enables trigger to generate charging events. In an embodiment, the BTAS 102 may also be integrated with components pertaining to customized caller ringback tone for enabling personalized ringback tone (RBT) at the stage of establishing the communication. For example, this may be mainly related to the ringback tone that may be played while connecting a call communication of the user device with the plurality of participating entities.

In an embodiment, the external server (SAAS gateway) 104 may perform authentication of the user device 110 and/or the application on the user device, prior to receiving the input information and/or the communication request. In an example embodiment, the authentication may be performed through a password based authentication such as, for example, one-time password (OTP) based authentication technique. In an embodiment, the OTP authentication may be performed via interfacing with short message service center (SMSC) 302, which may be operational with the SAAS gateway 104 via known protocol such as, Short Message Peer-to-Peer (SMPP). For example, the SMSC 302 may be responsible for tasks such as, for example, for receiving, storing, routing and forwarding SMS messages from or to user device. In an example, the SMSC 302 may assist in generation and/or verification of OTP messages, which may be used for verification of the user device running the application 316. It may be appreciated that the authentication may not be limited to the mentioned technique and various other mechanisms are also possible within the scope of the present disclosure.

In an example embodiment, the BTAS 102 may receive input information such as, for example, list of participating entities, conference request actions (for example, add/delete/mute/unmute related actions). For example, the BTAS 102 may handle conference participant list and/or status notification with user device application 316 on RESTful interface as received via SaaS Gateway. The input information may be received at the external server (SAAS gateway) 104 from the user device application 316 through web sockets. The received information may be forwarded towards subscriber home circle BTAS 102 (for example, on RESTful). Upon establishing the concurrent communication, the SAAS gateway may also receive conference status notification messages (such as, for example, related to Join/Unjoin/Terminate actions) and may forward the same towards user device application 316 (for example, on Web Sockets). Various other protocols may be used within the scope of the present disclosure. The concurrent communication can thus allow to establish the conference call, without the need to sequentially add the participating entities. This may reduce conference establishing time considerably and may also enable to optimize the effective usage of communication time.

In an example embodiment, the concurrent communication may be established by a user device (such as VOLTE device) by initiating a communication request using an executable set of instructions or an application configured on the user device. In an example embodiment, the communication request may be sent from the user device to the external server or SAAS gateway in form of, for example, a HTTPS post message, wherein a participant list may also be sent. The SAAS gateway may send message to BTAS or network device and may send confirmation to the user device. Once confirmation may be received, the user device may initiate communication, through the configured application. For example, to initiate communication, the user may dial a number or a pre-defined digit code, for example, 54368, using native dialer. As a normal VOLTE call, TAS pertaining to device of user (for example user A or A party) will receive the call and process it. Upon verification of a party profile, corresponding TAS may send the communication for termination leg, wherein ICSCF may send the call towards BTAS based on the predefined number. Once call may be received in BTAS, it may initiate communication with participating entities (108) (such as participating entity 1) towards IBCF with marking as origination leg, wherein from IBCF, the communication may be sent to CFX and then to TAS corresponding to A Party for further routing towards the participating entity 1. In a similar way, the communication will be initiated towards all the participants in parallel and bridged with a party accordingly.

In an embodiment, the concurrent communication may include conferencing service that may enable a multi-party voice and/or video conversation using conference application on the user device. This service may be equipped with several features as mentioned herein. In an example embodiment, the user may be able to instantly and dynamically select participants from its address book and makes a call (SIP INVITE Request) to conference service using application on the user device, which may enable to create a conference and invite all the participants to the conference. In an example embodiment, the concurrent communication may enable a user to use and/or control at least one of the below mentioned features:

Create Ad-hoc Conference,
Create Schedule Conference,
Re-schedule a scheduled Conference,
Cancel a scheduled Conference,
Reminder for a schedule conference,
Add new user to conference,
Remove user from conference,
Mute and Unmute complete conference,
Mute and Unmute individual participant,
Get status of the participants in the conference.

In an embodiment, the system and method may enable validation of conference originator of the user. For example, a user number received in REST (conference create) request may be matched with the INVITE request received from the user. In this example, conference may be created only if the request matches, otherwise INVITE request may be rejected. This may ensures that conference service may not be used if there is any mismatch of number configured, for example, in client application and on SIM. In an example embodiment, the system and method may support SMS intimation to participants of scheduled conference or concurrent communication. For example, the user device application may enable to send SMS to all the participants about details or information such as, schedule conference creation, re-schedule, reminder and cancellation of scheduled conference and other such information. In this example, the SMS may contain information about conference creator name and number, date and time, subject and duration of the scheduled conference and other such details.

In an example embodiment, a support dynamic status update of participant may be sent to conference originator or the user. In another example, status pertaining to any participant being added or removed/disconnected or put conference on hold may be displayed in real time to conference originator or user. In another example embodiment, the user may be able to control media of conference. For example, the user may be able to make it one-way or two-way communication as needed during the conference call, for example, by pressing mute and unmute button for complete session or individual participant which may trigger HTTPs request towards corresponding server. This may find use in application such as, for example, a lecture or speech delivery during which there may be a need for ambient noise (one-way speech) followed by a question and answer session during which the call originator may turn on the two way communication. In an example embodiment, the system may be able to support 2N redundancy to maintain conference status of all the participants during any server failover scenario. In another example embodiment, the support SIP option may maintain availability status of MRF servers and load distribute between multiple MRF blades.

In an aspect, the system and method of the present disclosure may also enable a bridge conference in which a group of people may be able to participate in an ongoing audio/video conference by dialling a particular number (bridge number) from their handset/device. In an example embodiment, the bridge conference may be created by sending REST request, wherein upon creating Bridge conference successfully, details such as, for example, Bridge id, Bridge Pass key, Master ID may be sent to session creator/host. The Master ID may pertain to host in bridge conference i.e. session creator of bridge conference. The Bridge ID and pass key may pertain to participants who may join the conference. In an example, when participants may dial bridge number, they may be asked to enter bridge ID and pass key to join the bridge conference. In an example, only one host may be present in the conference. In an example, if any participant may before Host joins the conference, then they may be able to listen default theme music and only after joining of the host, the concurrent communication may be established. In another example embodiment, if the host may leave the conference and may not join in configured time then bridge conference may be destroyed. In an example embodiment, the bridge conference may be scheduled or created dynamically or instantly for particular duration of time, wherein the duration may be modified by the host before starting of schedule or ongoing conference. In another example, the system may also support bridge video conference, which may be implemented as VAS (Voice Activated Switching) conference. It may be appreciated that the embodiments may also extend to video call, audio call or their combination as used in a bridge conference communication.

Figure 4A:
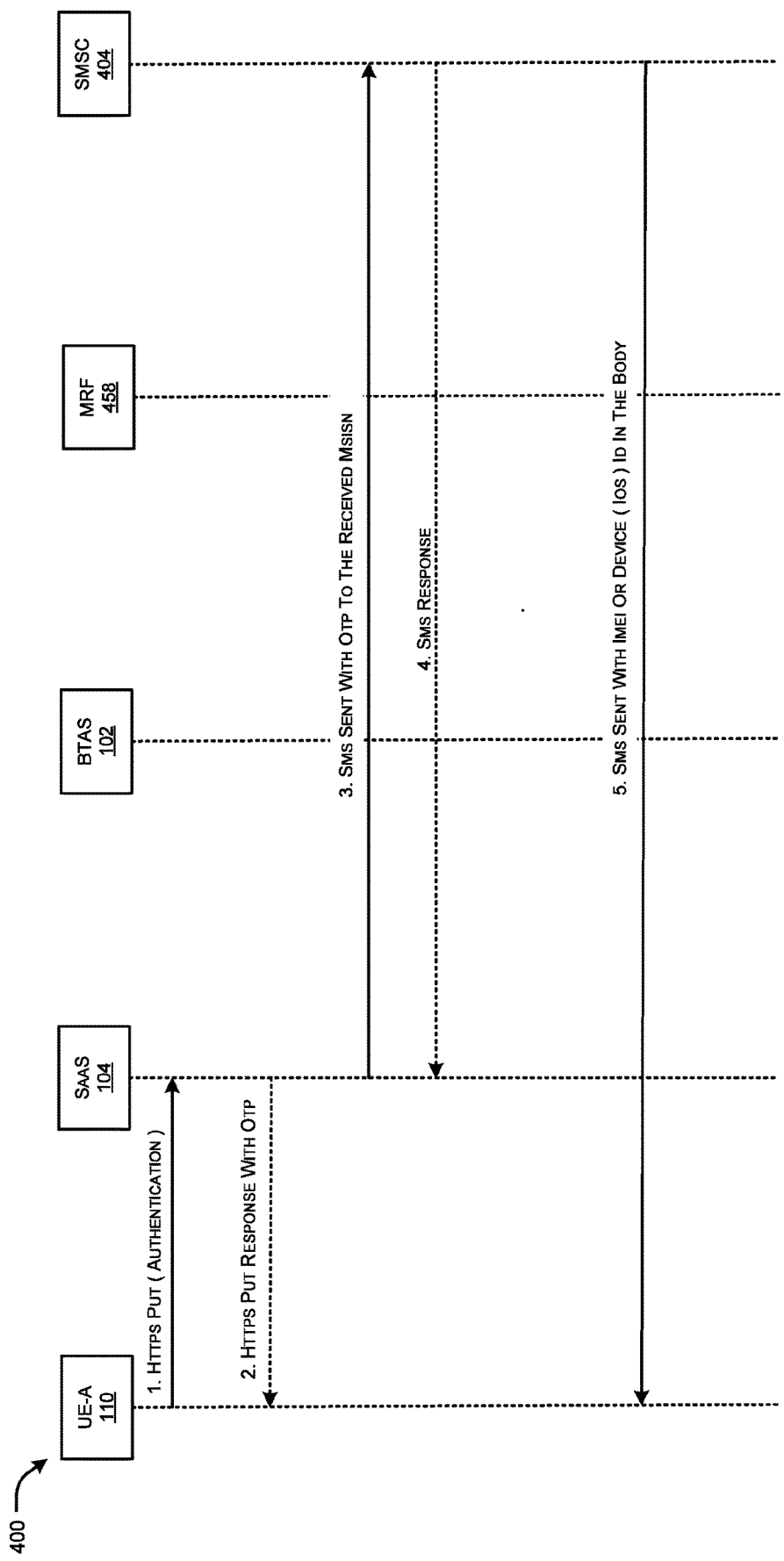
FIGS. 4A-4E illustrate exemplary representation showing various steps pertaining to process for establishing concurrent communication, in accordance with embodiments of the present disclosure.

FIGS. 4A-4E illustrate exemplary representation 400 showing various steps pertaining to process for establishing concurrent communication, in accordance with embodiments of the present disclosure. In an embodiment and as shown in FIG. 4A, an initialization step is shown for a user device or user equipment (UE-A) 110 corresponding to a user (or user-A in this example). The initialization step may include an authentication of the UE-A 110 through external server or SAAS gateway 104. As shown in FIG. 4A, a communication request may be initiated from the UE-A 110 to the SAAS gateway 104. For example, a request (PUT request) may be sent to the SAAS gateway 104, wherein the PUT request may include, for example, Mobile Country Codes (MCC), Mobile Network Code (MNC), user entered information such as, Mobile Station International Subscriber Directory Number (MSISDN) information and other such information, which may be stored in a database. In an example embodiment, the SAAS gateway 104 may check if the user is a subscriber of the services provided by the service provider, based on, for example, the MCC and MNC information, such that if the user is not found to be the subscriber then a message or response such as, 403 forbidden response may be sent from the SAAS gateway 104 to the UE-A 110. However, if the user may be found to be a subscriber, a PUT response bearing the OTP information may be sent to the UE-A. In the next step, SMSC 404 may enable to generate a short message service (SMS) along with other information such as device ID to the UE-A. Based on comparison of the OTP received in the SMS (from SMSC 404) and the OTP received in the PUT response (second step) from SAAS gateway 104, the user device may be authenticated. Various other steps or types of authentication may also be possible.

Figure 4B:
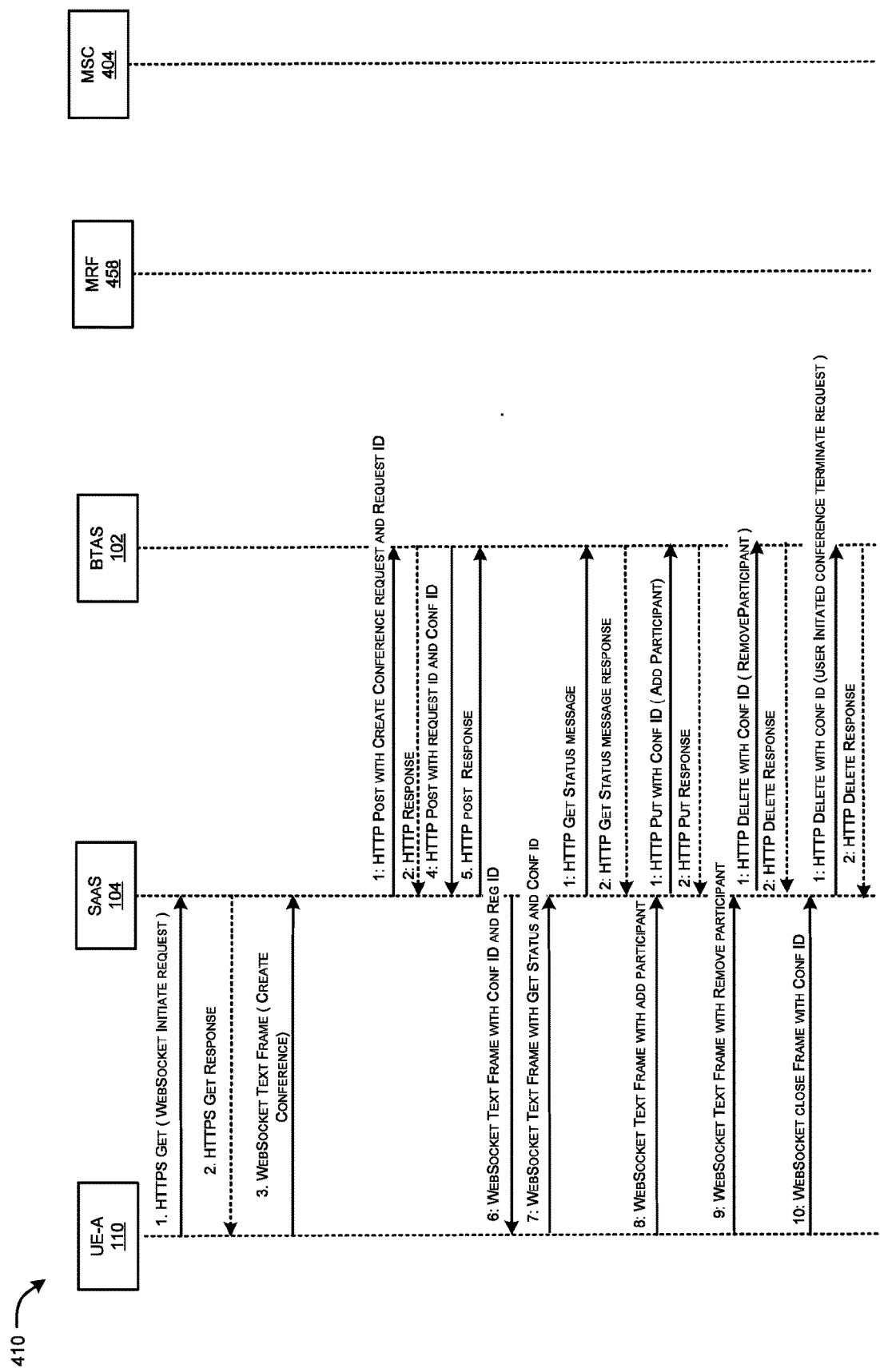

In an embodiment and as shown in FIG. 4B, a communication setup is depicted for a user (user A or A-party) using a user device UE-A 110 wherein the user A may be a subscriber of the network service provided by service provider facilitating the service pertaining to concurrent communication. As shown in FIG. 4B, the communication setup may be initiated upon receiving a communication request from the user device UE-A 110. For example, the communication request may be received as per HTTPs protocol via web socket. The detailed steps are illustrated in FIG. 4B, wherein the steps 1-3 mainly involve communication between user device UE-A 110 and SAAS gateway 104, followed by steps 3.1 to 5 involving creation of conference request ID based on communication between the SAAS gateway 110 and the network device or BTAS 102. The further steps 6 to 10.2 pertain to obtaining status message, addition and/or removal of participant and other steps related to setting up the communication.

Figure 4C:
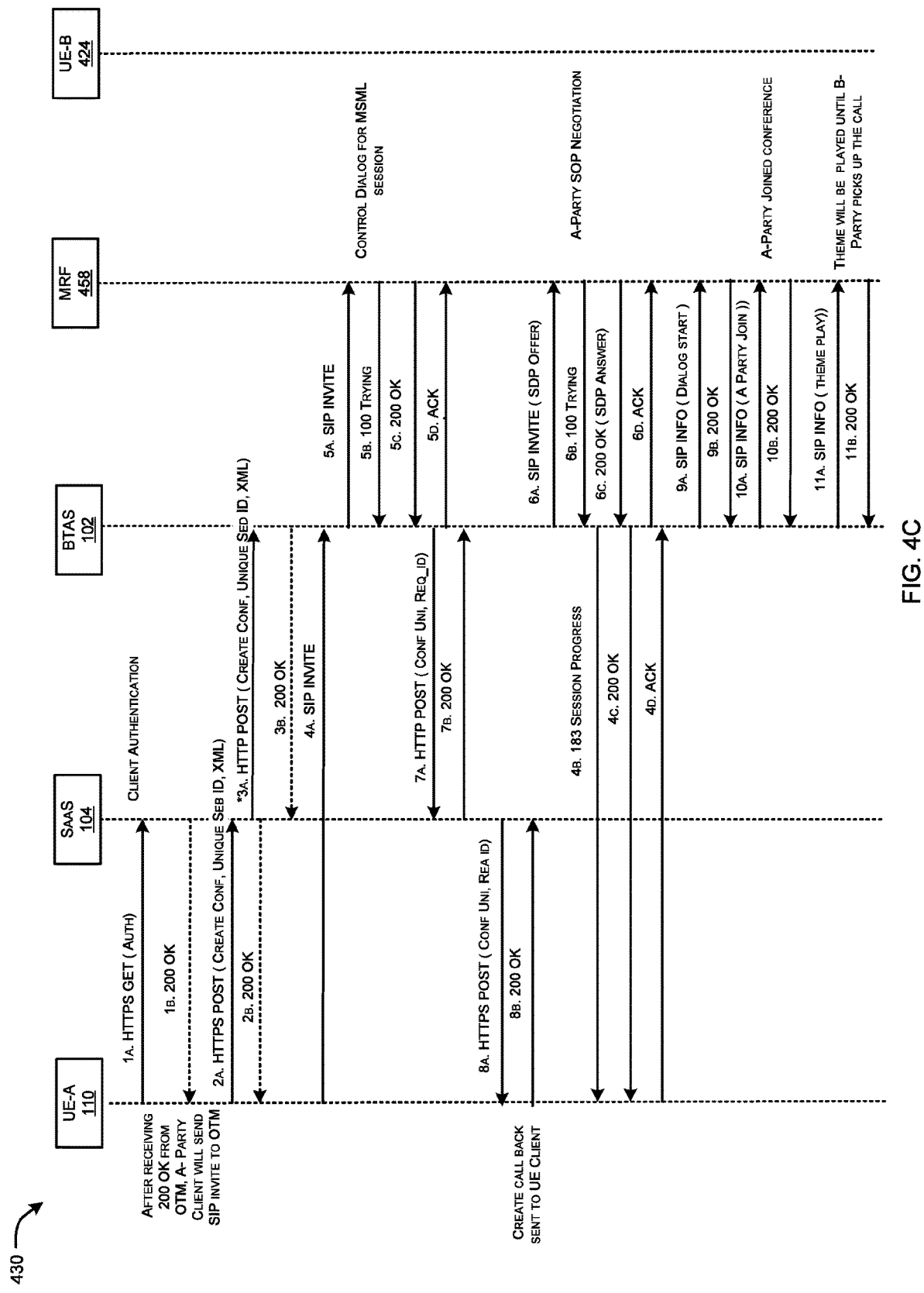

In an embodiment and as shown in FIG. 4C, the steps involved in initiation of concurrent communication between user (user A or A-party) using a user device UE-A 110 and another participating entity (user B or entity B or B-party), wherein the user A may be a subscriber of the network service provided by service provider facilitating the service pertaining to concurrent communication. The user A may be the user initiating and/or controlling aspects of the concurrent communication whereas the user B or entity B may be only participating in the concurrent communication using the entity device (UE-B 424). The detailed steps are illustrated in FIG. 4C wherein after authentication of device UE-110 (step 1A) and creation of conference ID (step 2A), an HTTP POST message may be sent from SAAS 104 to BTAS 102. In an embodiment, the HTTP POPST message may include a request for initiating a conference communication associated with the conference ID. On receiving confirmation at step 3B, an SIP invite may be sent to BTAS 102 (step 4A), which may be further sent to MRF 458 (step 5A) for enabling control dialog for Media Server Markup Language (MSML) session. The other steps may include SOP negotiation for user A, based on which A-party or user A may first join the concurrent communication (at step 10A).

In an example embodiment, a theme may be played until B-party may join the concurrent communication (or the conference communication).

Figure 4D:
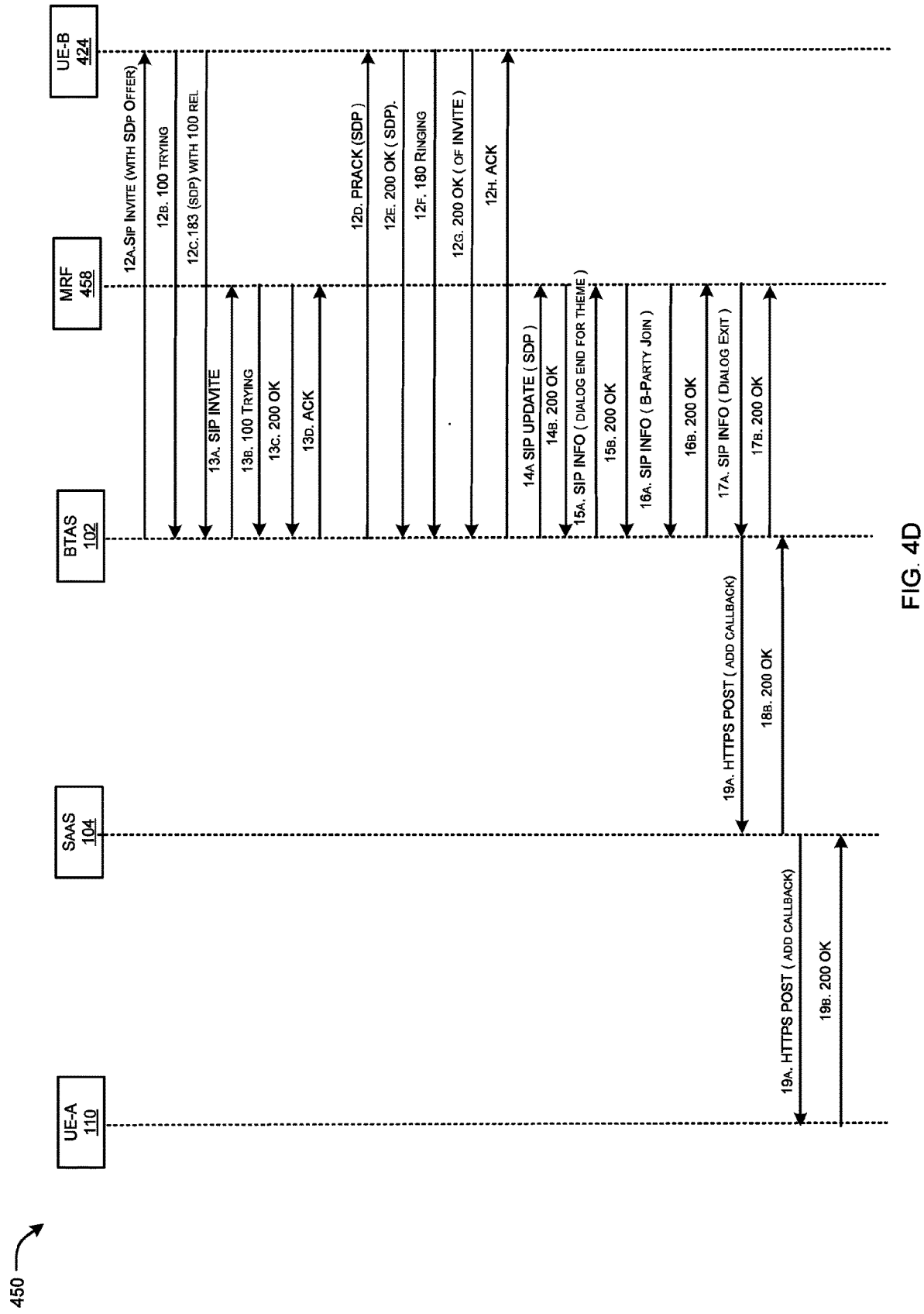

In an embodiment and as shown in FIG. 4D in reference to FIG. 4C, steps involved in participant addition procedure is explained with respect to concurrent communication between user (user A or A-party) using a user device UE-A 110 and another participating entity (user B or entity B or B-party) (similar to FIG. 4C). The detailed steps are illustrated in FIG. 4D, wherein after joining of the user A in the concurrent communication, the network device may send SIP invite to entity device UE-B 424. In an embodiment, the BTAS 102 may attempt to connect with the entity device of the participating entity for a pre-defined number of times until the communication may be established with the entity device UE-B 424 (as shown in step 12H), based on which the party B or participating entity B may join, as shown in steps 14A to 17B.

Figure 4E:
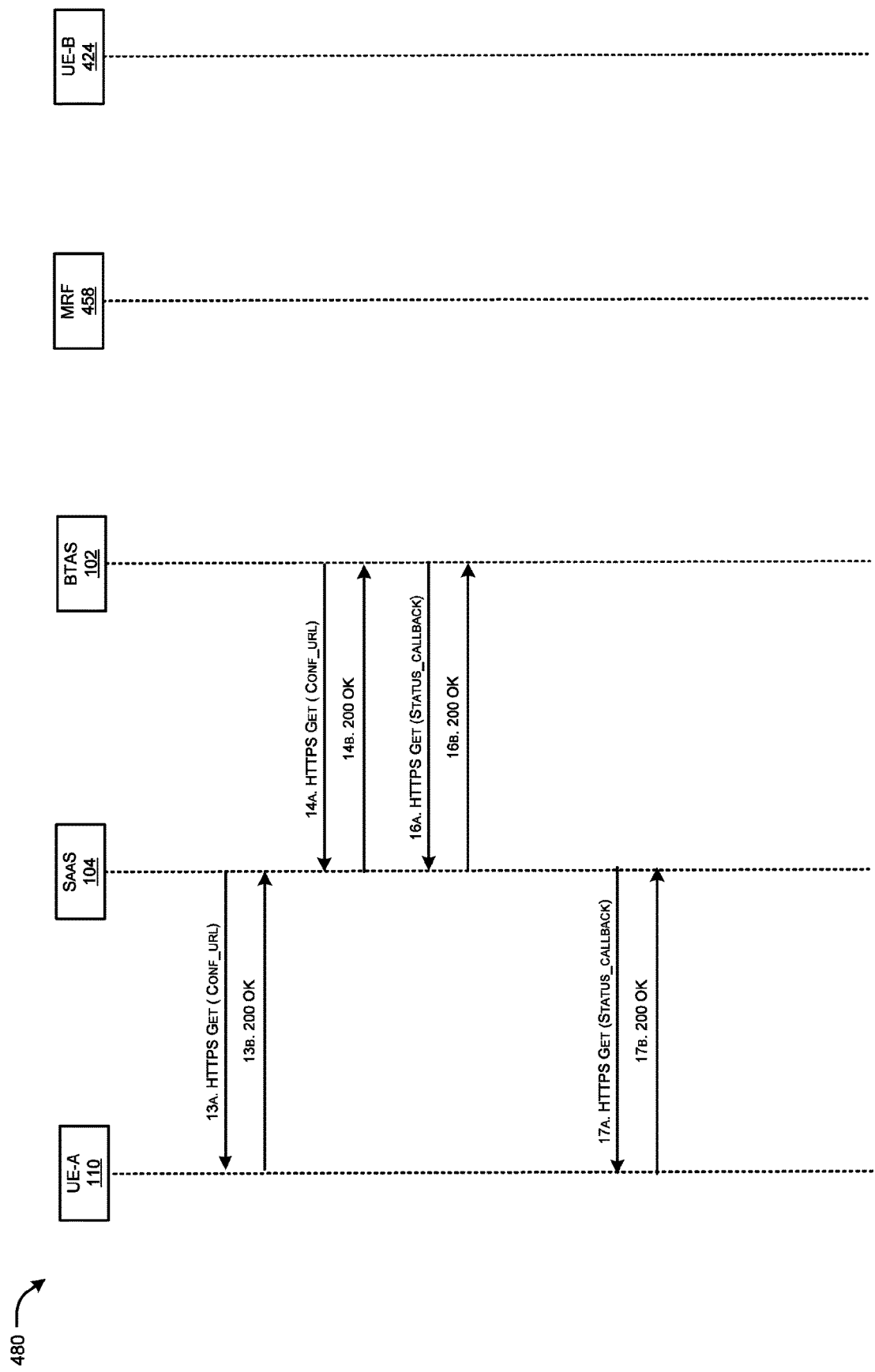

In an embodiment and as shown in FIG. 4E in reference to FIG. 4D, steps involved in participant status update procedure is shown via communication between user device UE-A 110, SAAS 104 and BTAS 102. It may be appreciated that although only one participating entity B may be shown for simplicity, but the same steps may be applicable in case of other participating entities (108) in concurrent communication.

Figure 5A:
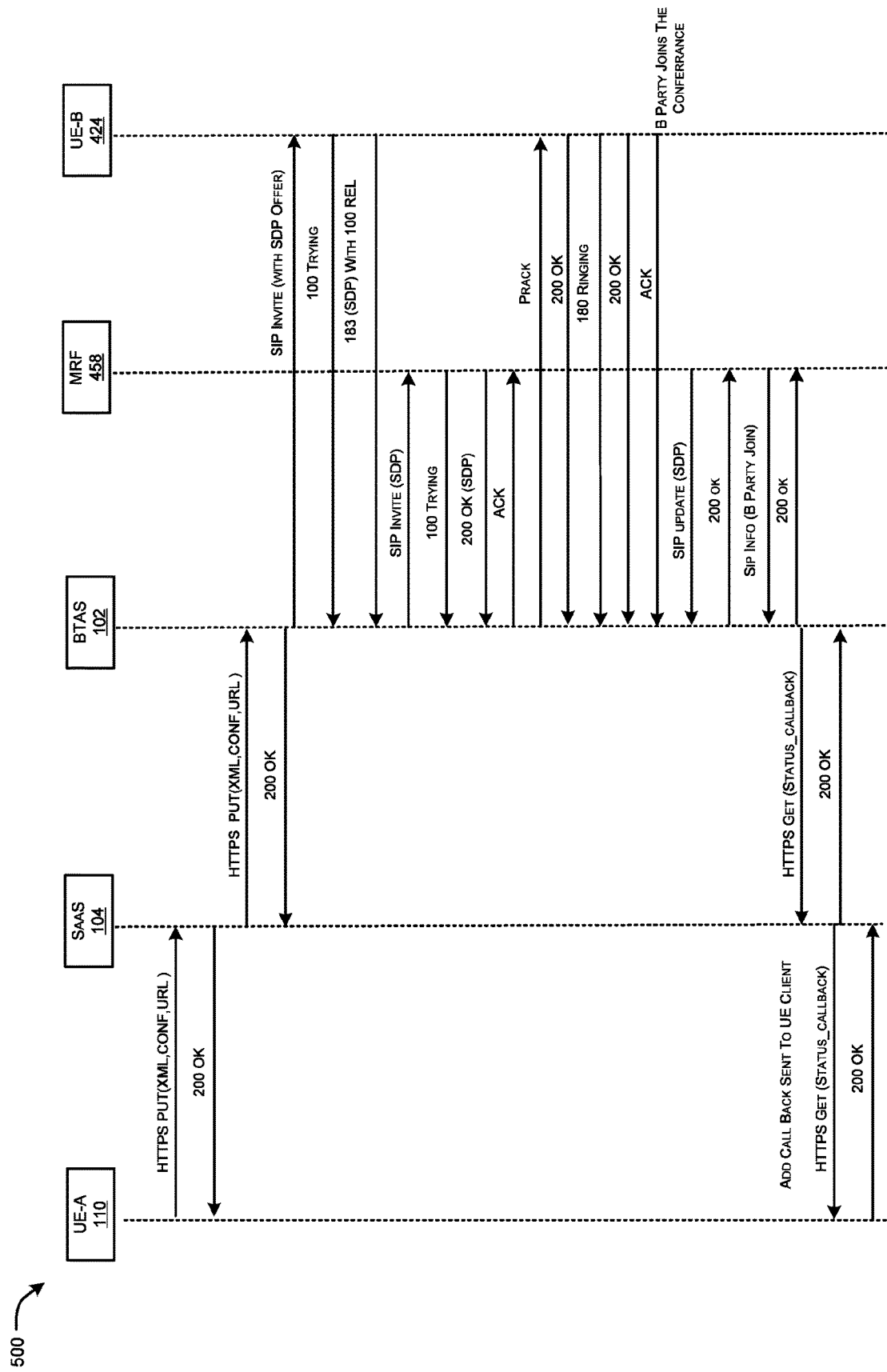
FIGS. 5A-5B illustrate exemplary representations showing various steps pertaining to addition and removal of participating entity in a concurrent communication, in accordance with embodiments of the present disclosure.
Figure 5B:
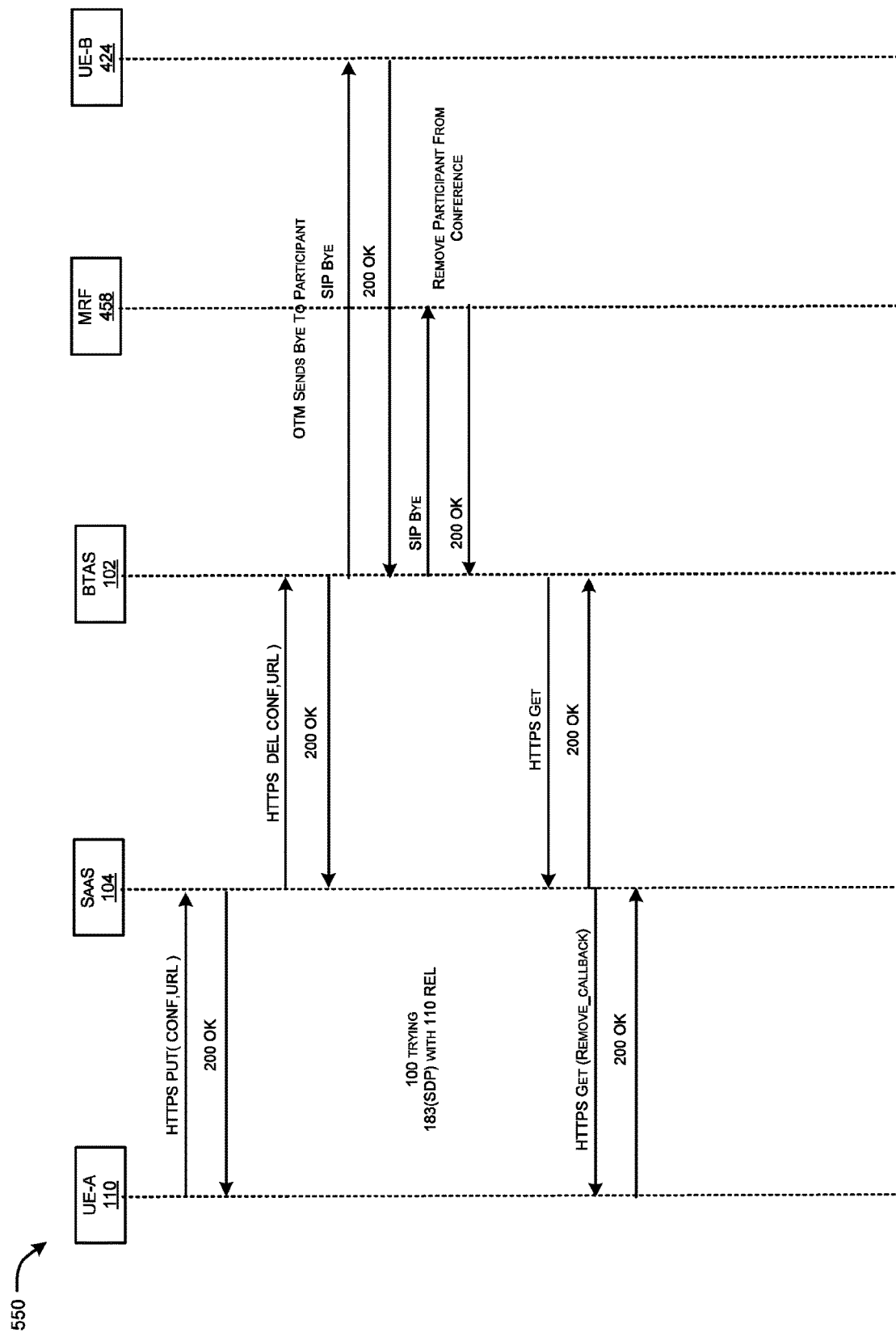

FIGS. 5A-5B illustrate exemplary representations 500 and 550 respectively, showing various steps pertaining to addition and removal of participating entity in a concurrent communication, in accordance with embodiments of the present disclosure. In an embodiment and as shown in FIGS. 5A-5B, the concurrent communication may be established between a user device or user equipment (UE-A) 110 corresponding to a user (or user-A in this example), wherein the user A may be a subscriber of the network service provided by service provider facilitating the service pertaining to concurrent communication. The user A may be the user initiating and/or controlling aspects of the concurrent communication whereas the user B or entity B may be only participating in the concurrent communication using the entity device (UE-B 424). The illustration in FIGS. 5A-5B indicate steps involved in addition and removal of a participating entity (entity B) from a concurrent communication, based on instruction from user A device (UE-A 110). For example, as shown in FIG. 5A, the steps mainly indicate communication between the user device UE-A 110, SAAS gateway 104 and BTAS 102 that enables to add the participating entity through a SIP invite to entity device UE-B 424 to enable joining the concurrent communication. Similarly, in another example, as shown in FIG. 5B, the steps mainly indicate communication between the user device UE-A 110, SAAS gateway 104 and BTAS 102 that enables to remove the participating entity B through a SIP based message (such as SIP BYE) that is forwarded to the entity device UE-B 424 to enable removal of the entity B from the conference communication. Various other aspects may be possible within the scope of the present disclosure. It may be appreciated that although only one participating entity B may be shown for simplicity, but the same steps may be applicable in case of other participating entities in concurrent communication.

FIG. 6 illustrates exemplary representation 600 showing steps pertaining to converting a concurrent communication to a lecture mode, in accordance with an embodiment of the present disclosure. In an embodiment and as shown in FIG. 6, the concurrent communication may be established between user device (UE-A) 110 corresponding to user A initiating and/or controlling aspects of the concurrent communication whereas the user B or entity B may be only participating in the concurrent communication using the entity device (UE-B 424). The illustration in FIGS. 5A-5B indicate steps involved in conversion of the concurrent communication into a lecture mode, based on instruction from user A device (UE-A 110). For example, as shown in FIG. 6, a request to convert to lecture mode may be received through the SAAS gateway 104 at the BTAS 102, wherein the request may be sent from user device (UE-A 110). Based on the request, the BTAS 102, through communication with MRF 458, may enable muting all the selected participating entities (such as entity B in this case). The muting may allow only the user A and/or other selected participating entities (approved by user A) to communicate or speak during the concurrent communication (conference communication), thus enabling conversion of the conference communication to lecture mode. Various other aspects may be possible within the scope of the present disclosure. It may be appreciated that although only one participating entity B may be shown for simplicity, but the same steps may be applicable in case of other participating entities in concurrent communication.

Figure 7:
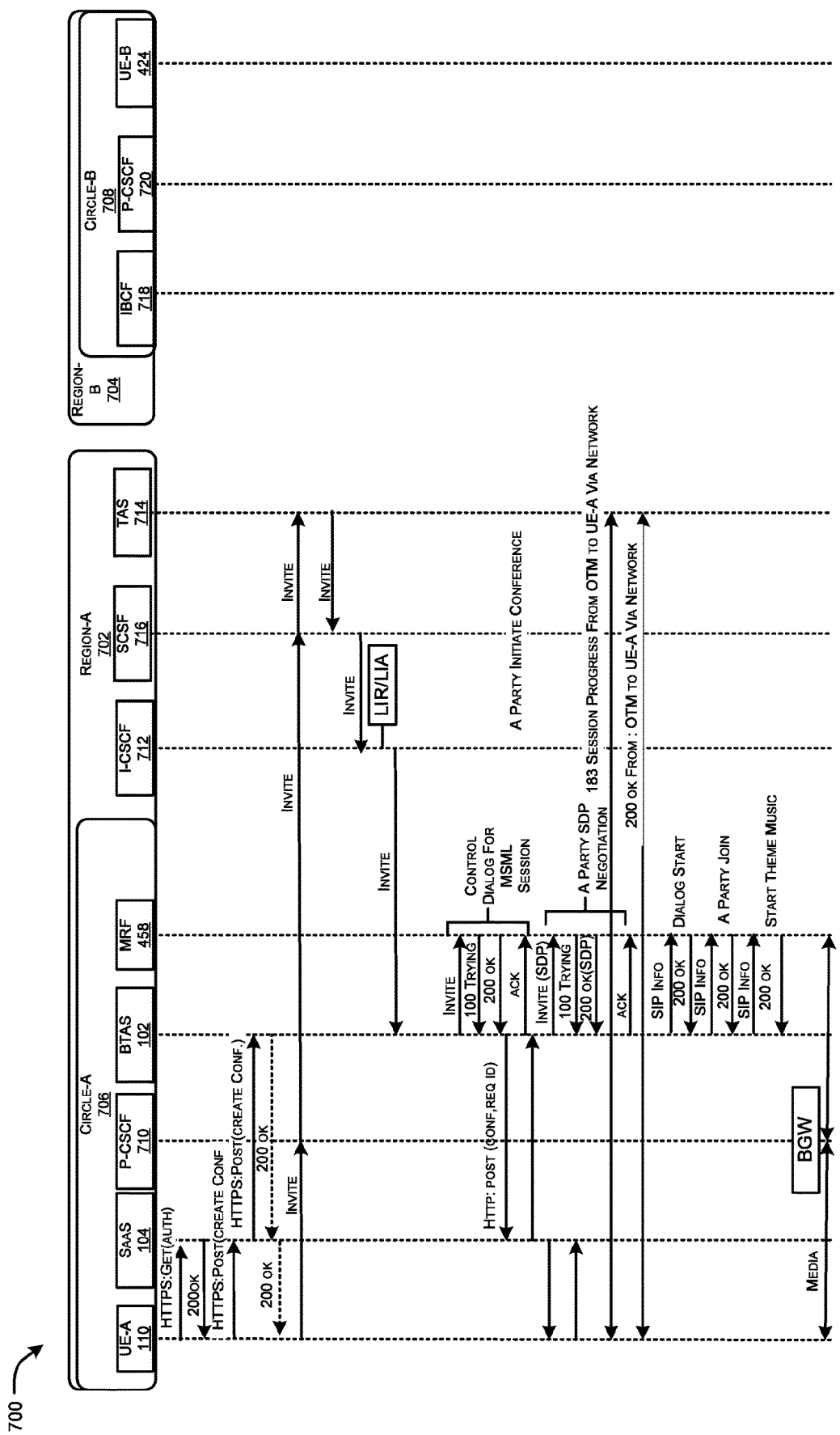
FIG. 7 illustrates exemplary representation showing steps pertaining to communication flow in a concurrent communication initiated by a user in a home circle, in accordance with an embodiment of the present disclosure.

FIG. 7 illustrates exemplary representation 700 showing steps pertaining to communication flow in a concurrent communication initiated by a user in a home circle, in accordance with an embodiment of the present disclosure. In an embodiment and as shown in FIG. 7, the concurrent communication may be established between user device (UE-A) 110 and entity device (UE-B 424). The user device (UE-A) 110 may correspond to user A who may initiate and/or control aspects of the concurrent communication in a home circle (Circle-A) 706 in region A (702). The user B or entity B may be a participating in the concurrent communication using the entity device (UE-B 424) and may pertain to a different circle (Circle-B) 708 in region B (704). The illustration in FIG. 7 indicate steps involved in initiation of the concurrent communication based on message received from user A device (UE-A 110), which may be in the home circle. For example, as shown in FIG. 7, the communication may be a communication call originating from user A device 110 to BTAS 102, wherein the communication call may be answered after establishing a session with MRF 458. In an example, the user A may hear a default theme music on the user device A 110 upon initiation of the communication call such that the default theme music may continue until a message such as "200 OK" may be received from any one of the participating entities (entity B in this case). In an example, a ring back tone (RBT), a caller ring back tone (CRBT) or a Personalised Ring back Tone or PRBT may be connected to the user device A 110. In an example embodiment, if the participant B may not answer the call, a timeout may occur and resource may be released. In an example, a pre-defined time duration may be set for the timeout. In an alternate example embodiment, in case if the communication call request may not be answered by all the participating entities, then the A-Party or user A may be able to customize corresponding charges based on pre-determined policy. Various other aspects may be possible within the scope of the present disclosure. It may be appreciated that although only one participating entity B may be shown for simplicity, but the same steps may be applicable in case of other participating entities in concurrent communication.

Figure 8A:
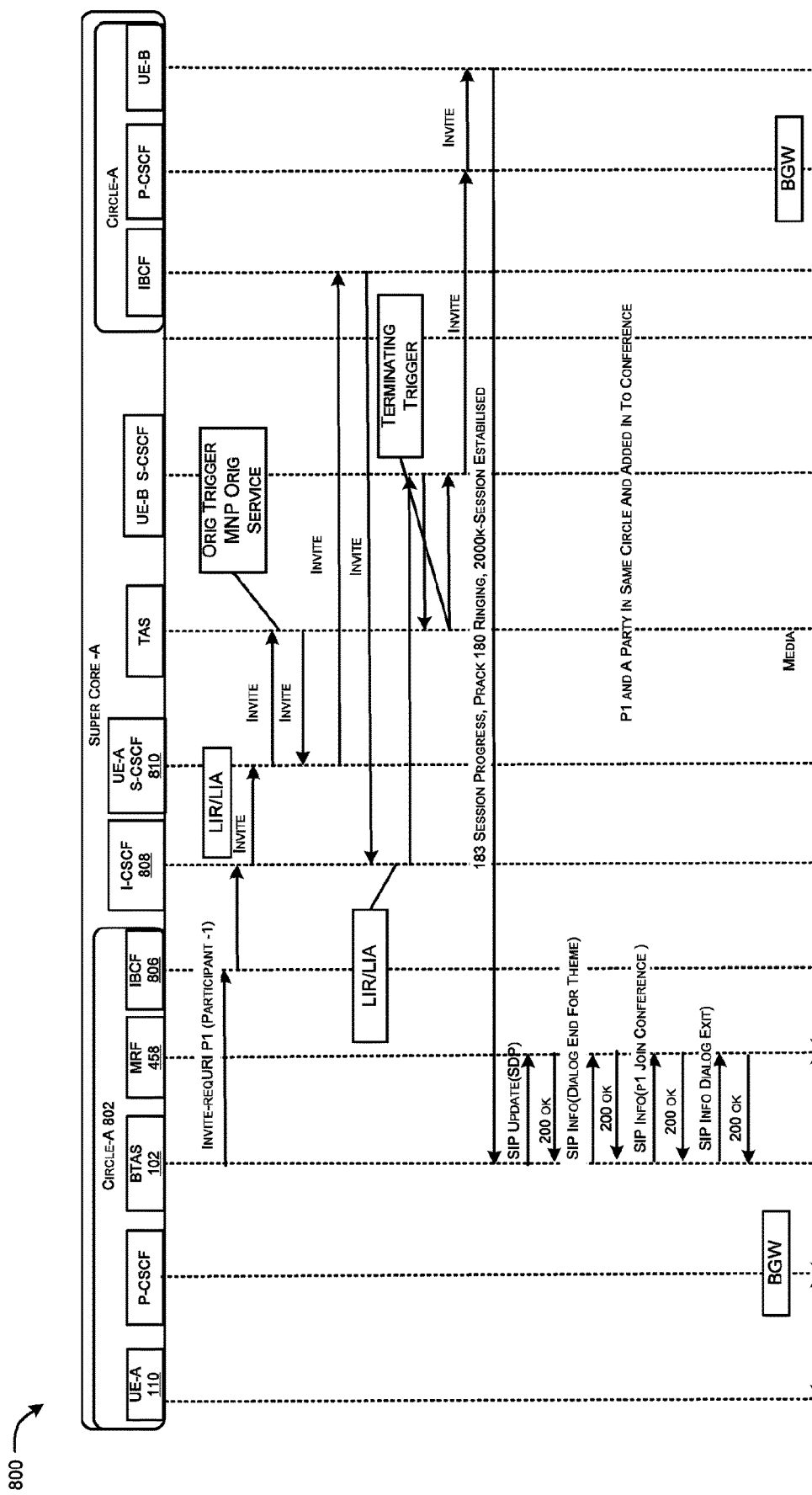
FIGS. 8A-8G illustrate exemplary representations showing various scenarios pertaining to participating entity in a concurrent communication, in accordance with an embodiment of the present disclosure.

FIGS. 8A-8G illustrate exemplary representations 800, 822, 830, 840, 860, 870, and 880 respectively showing various scenarios pertaining to participating entity in a concurrent communication, in accordance with an embodiment of the present disclosure. In an embodiment and as shown in 800 in FIG. 8A, the concurrent communication may be established between user device (UE-A) 110 and entity device (UE-B 424). In FIG. 8A, the user device (UE-A) 110 may correspond to user A who may initiate and/or control aspects of the concurrent communication in a home circle (Circle-A) 802 within a cluster or super-core A. The user B or entity B may be a participating in the concurrent communication using the entity device (UE-B 424) and may pertain to the same circle as that of user A device 110 i.e. Circle-A (702). The illustration in FIG. 8A indicate steps involved in establishing the concurrent communication. For example, the communication may be communication call originating from BTAS 102 to component of IMS server (106 of FIG. 1) i.e. IBCF 806, for example, by prefixing 1334. The IBCF 806 may perform normalization and forward to another IMS component i.e. I-CSCF 808. The I-CSCF 808 may assess a Location-Info-Request (LIR) or Location-Info-Answer (LIA), and may further route the communication call to A-Party S-CSCF (810) for processing. The details of the other steps are as shown in FIG. 8A, wherein a participating entity (B-Party) may be searched, based on which invite may be sent from IMS server. Further, media may be connected to MRF 458 once B-Party may answer as illustrated in FIG. 8A. In an example embodiment, the communication may be on-net local call and may be charged accordingly to A-Party/Conference charging policy. Various other aspects may be possible within the scope of the present disclosure. It may be appreciated that although only one participating entity B may be shown for simplicity, but the same steps may be applicable in case of other participating entities (similar to participant B i.e. in same circle) in concurrent communication.

Figure 8B:
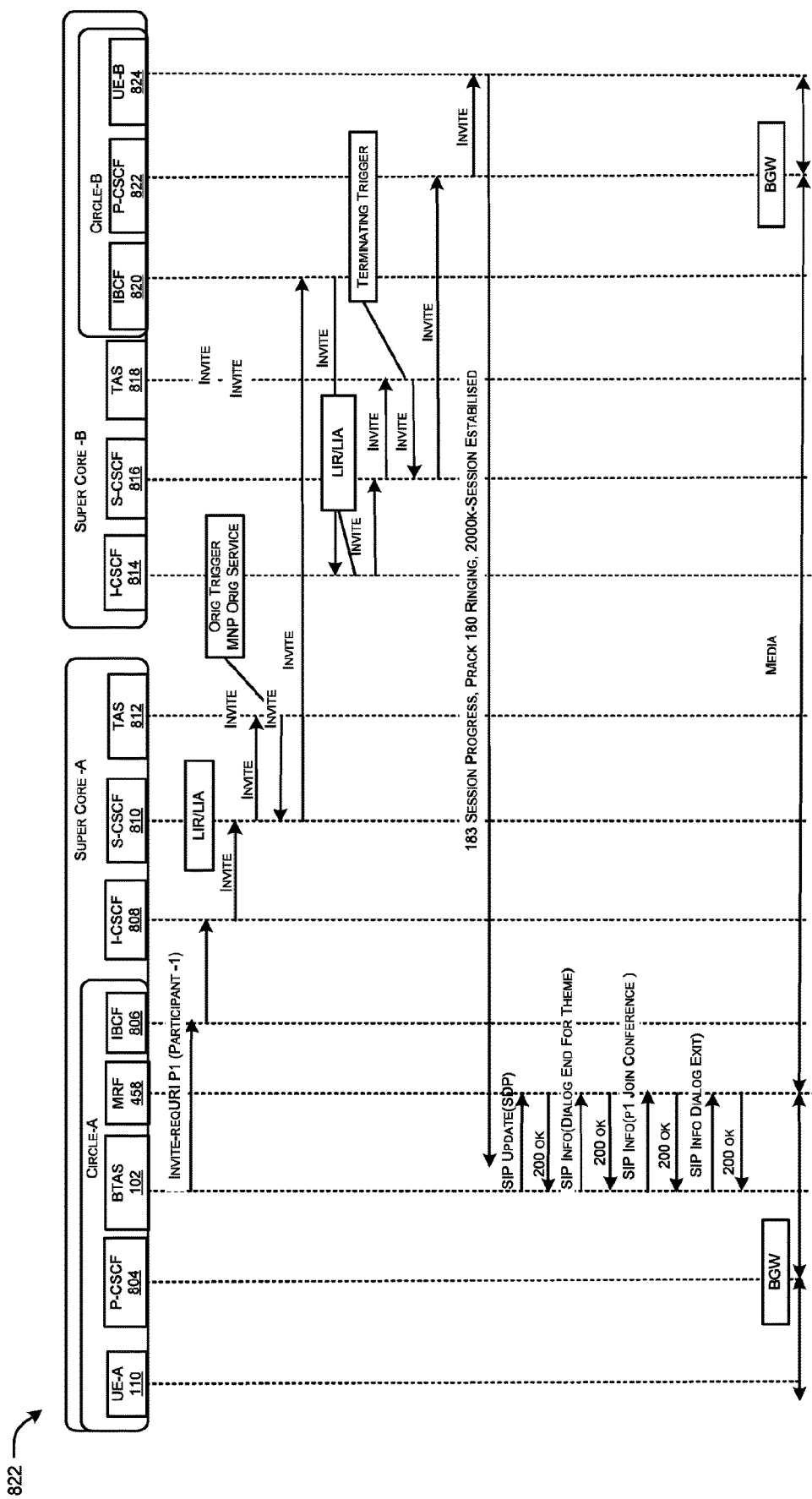

In an embodiment and as shown in 822 in FIG. 8B, the concurrent communication may be established between user device (UE-A) 110 and entity device (UE-B) 824. The user device (UE-A) 110 may correspond to user A who may initiate and/or control aspects of the concurrent communication in a home circle (Circle-A) within a cluster or super-core A. The user B or entity B may be a participating in the concurrent communication using the entity device (UE-B 424) and may pertain to a different circle Circle-A within a super-core B. The illustration in FIG. 8B indicate steps involved in establishing the concurrent communication, which may be similar as shown in FIG. 8A, except that the participating entity (B-Party) may be searched from corresponding circle B, based on which invite may be sent from IMS server and the communication may be established once entity B may respond.

Figure 8C:
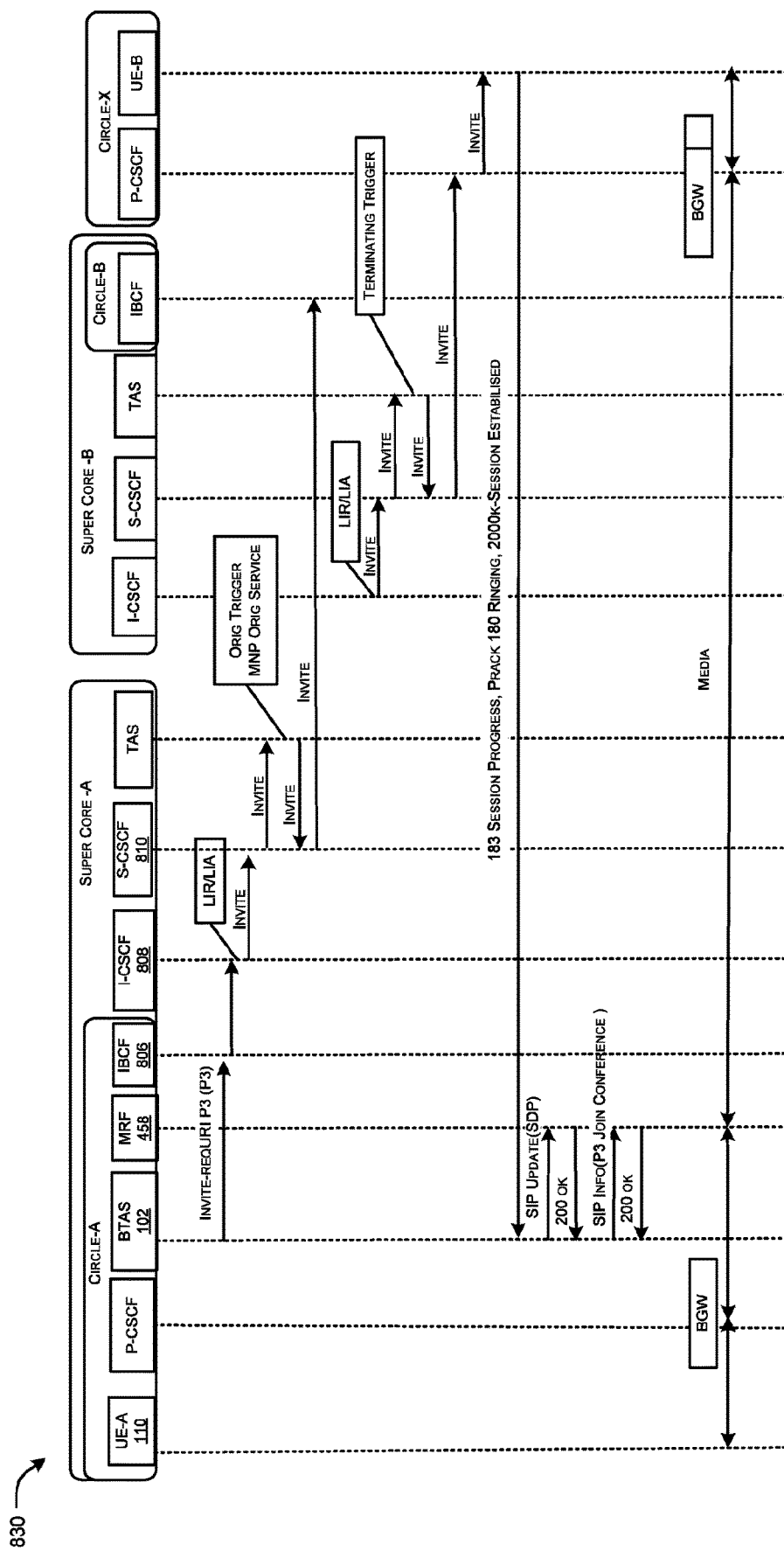

In an embodiment and as shown in 830 in FIG. 8C, the concurrent communication may be established between user device (UE-A) 110 and entity device (UE-B 424). Similar to FIG. 8A, the user device (UE-A) 110 may correspond to user A who may initiate and/or control aspects of the concurrent communication in a home circle (Circle-A) within a cluster or super-core A. However, the user B or entity B in this example may be a participating in the concurrent communication using the entity device (UE-B 424) and may be an inter-circle subscriber roaming in another circle. This means that user B who may belong to Circle B may be roaming in Circle X at the time of the concurrent communication. The illustration in FIG. 8C indicate steps involved in establishing the concurrent communication, which may be similar as shown in FIG. 8A, except that the participating entity (B-Party) may be searched from corresponding circle X, based on which invite may be sent from IMS server. In an example embodiment, as the B-Party may be roaming, the incoming calls may be charged as per roaming policy.

Figure 8D:
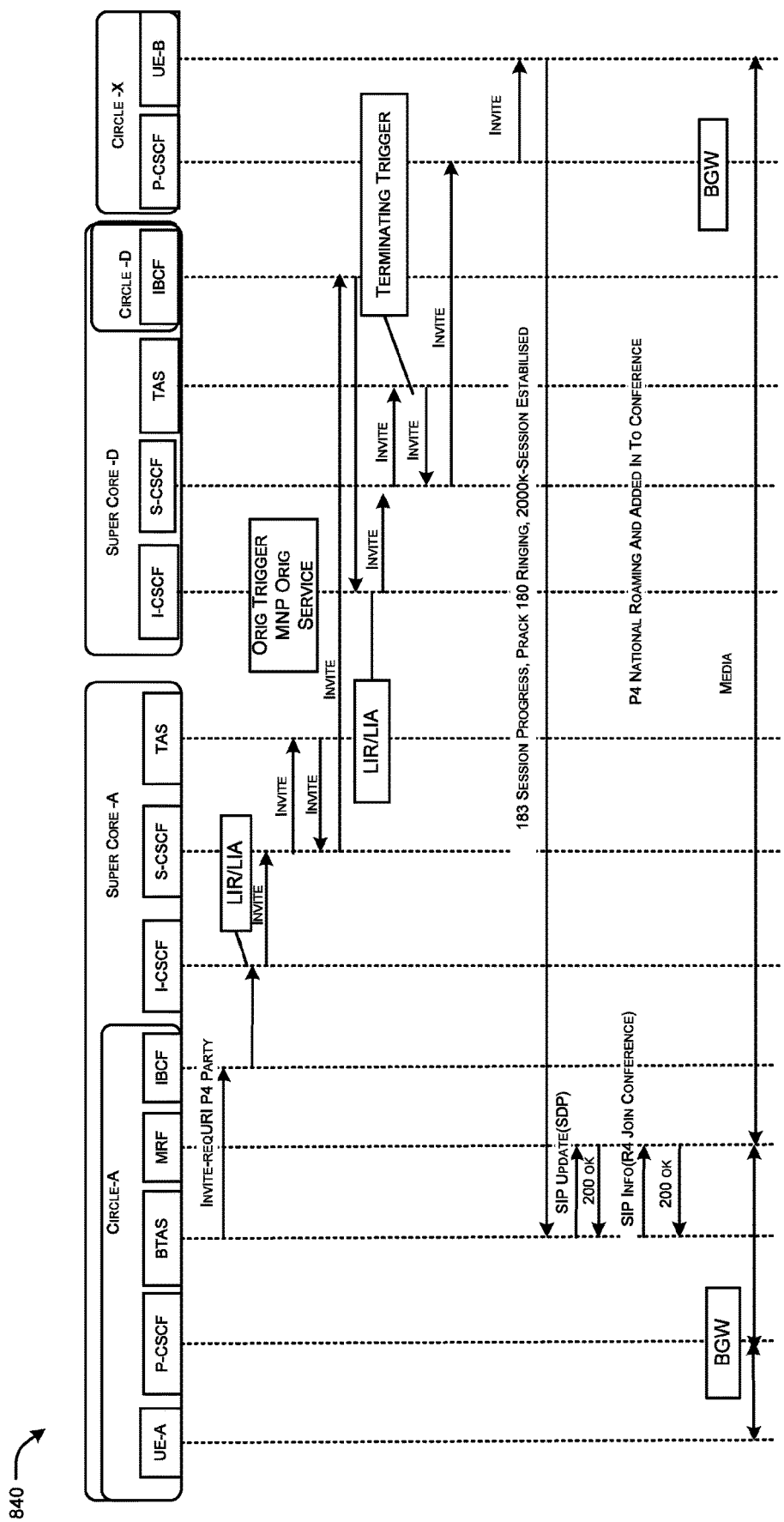

In an embodiment and as shown in 840 in FIG. 8D, the concurrent communication may be established between user device (UE-A) and entity device (UE-B). Similar to FIG. 8A, the user device (UE-A) 110 may correspond to user A who may initiate and/or control aspects of the concurrent communication in a home circle (Circle-A) within a cluster or super-core A. However, the user B or entity B in this example may be a participating in the concurrent communication using the entity device (UE-B 424) and may pertain to an offnet number or service. The illustration in FIG. 8D indicate steps involved in establishing the concurrent communication, which may be similar as shown in FIG. 8A, except that the participating entity (B-Party) may be searched from corresponding circle X, based on which invite may be sent from IMS server, wherein the invite may be routed from IMS network based on MSISDN and RN number of device of entity B or B-Party as received from a MNP server. In this example, the communication may be routed out via local POI. Further, as the communication may be off-net local call, the charges may be in accordance with A-Party as per conference charging policy.

Figure 8E:
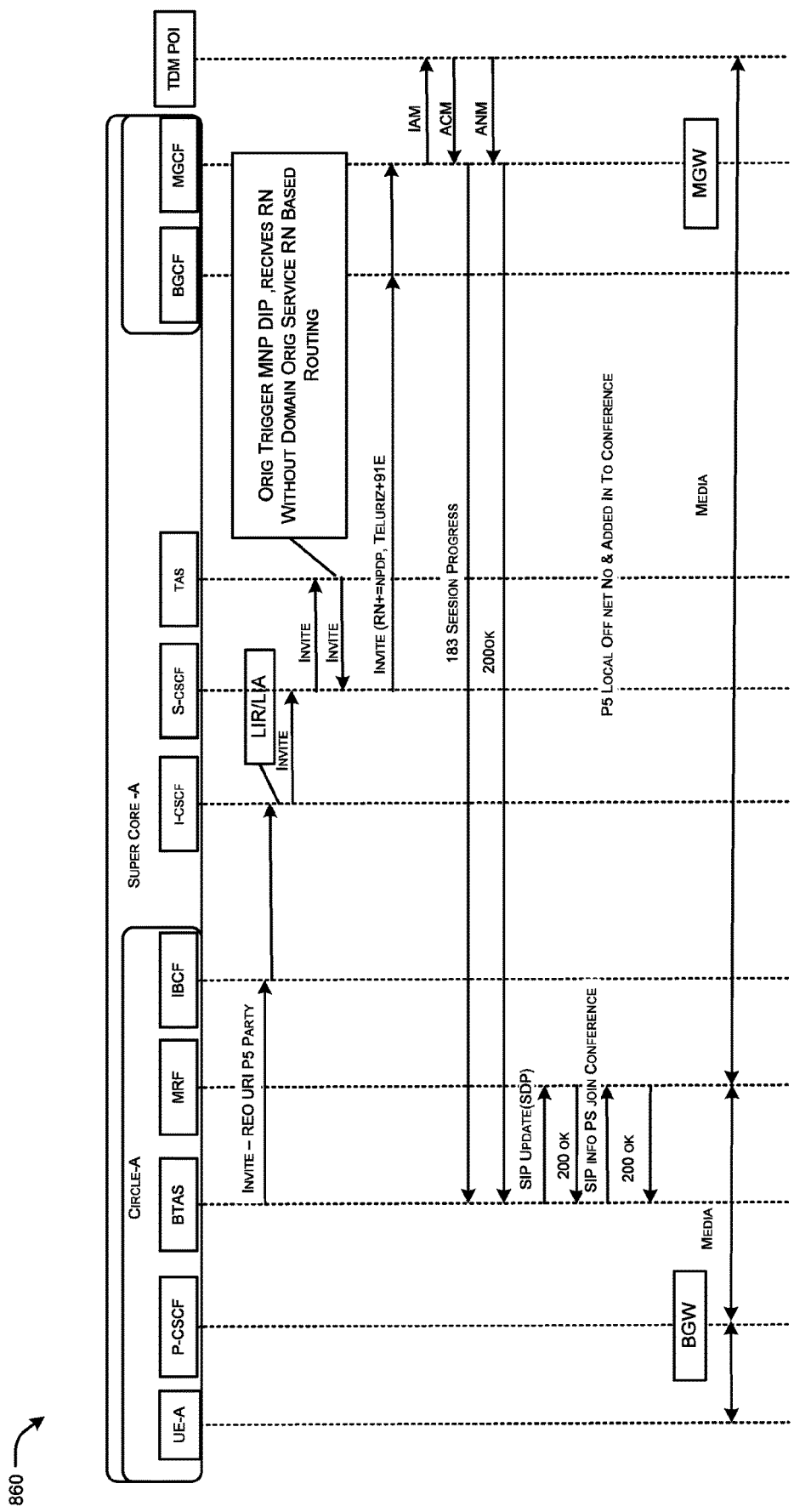

In an embodiment and as shown in 860 in FIG. 8E, the concurrent communication may be established between user device (UE-A) and entity device (UE-B). Similar to FIG. 8A, the user device (UE-A) 110 may correspond to user A who may initiate and/or control aspects of the concurrent communication in a home circle (Circle-A) within a cluster or super-core A. However, the user B or entity B in this example may be a participating in the concurrent communication using the entity device (UE-B) and may pertain to a national long distance (NLD) service. The illustration in FIG. 8E indicate steps involved in establishing the concurrent communication, which may be similar as shown in FIG. 8A, except that the invite may be routed from IMS network based on MSISDN of entity B or B-Party device as received from a MNP server. In this example, the communication may be routed out via B-Party home circle (NLD POI) established with B-Party operator. Further, as the communication may be NLD, the charges may be in accordance with A-Party as per conference charging policy.

Figure 8F:
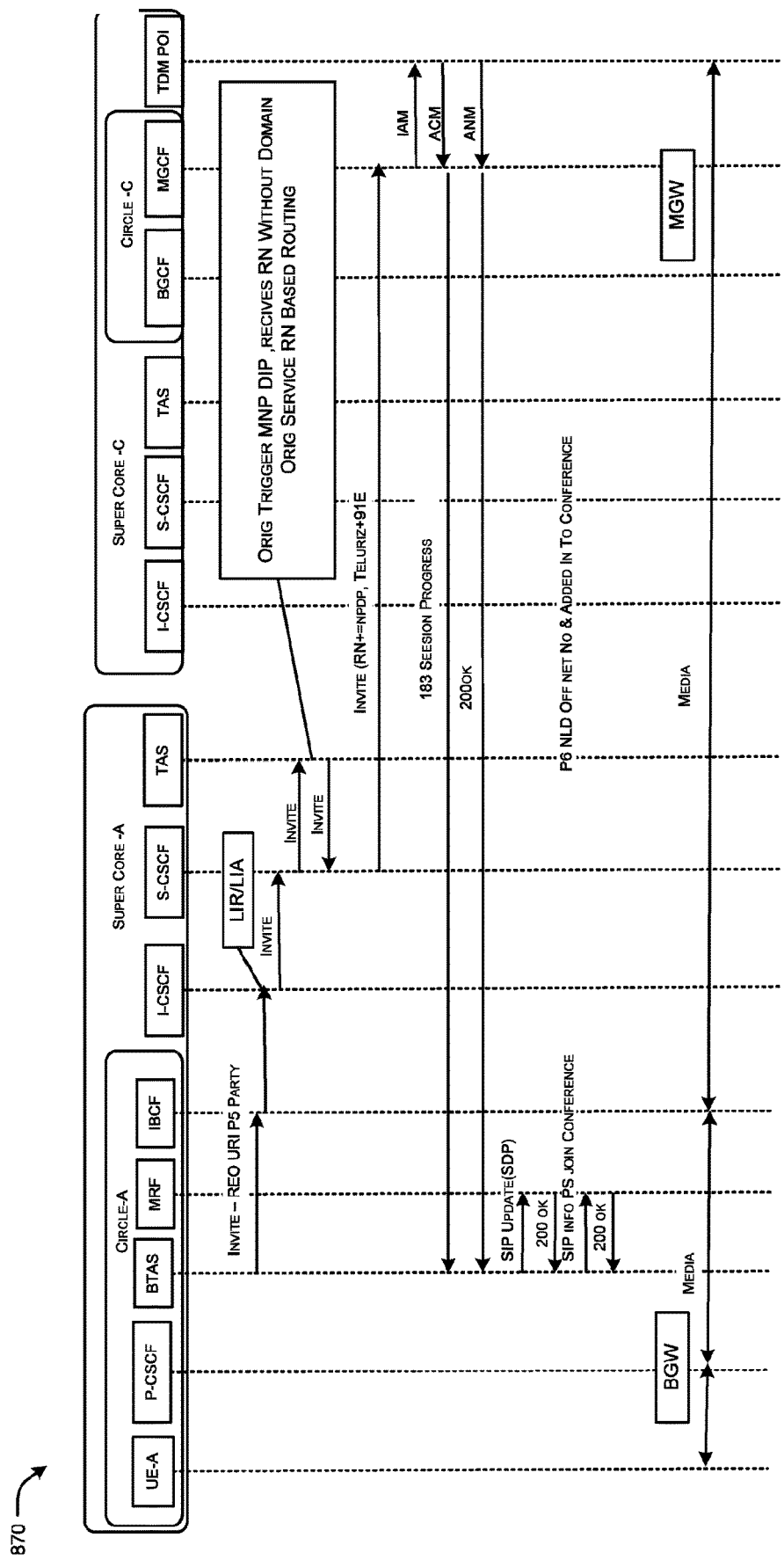

In an embodiment and as shown in 870 in FIG. 8F, the concurrent communication may be established between user device (UE-A) and entity device (UE-B). Similar to FIG. 8A, the user device (UE-A) 110 may correspond to user A who may initiate and/or control aspects of the concurrent communication in a home circle (Circle-A) within a cluster or super-core A. However, the user B or entity B in this example may be a participating in the concurrent communication using the entity device (UE-B) and may pertain to a national long distance (NLD) based offnet service. The illustration in FIG. 8F indicate steps involved in establishing the concurrent communication, which may be similar as shown in FIG. 8A, except that the invite may be routed from IMS network based on MSISDN and RN number of entity B or B-Party device received from MNP server. In this example, the communication may be routed out via B-Party home circle (NLD POI) established with B-Party operator. Further, as the communication may be NLD based off-net local call, the charges may be in accordance with A-Party as per conference charging policy.

Figure 8G:
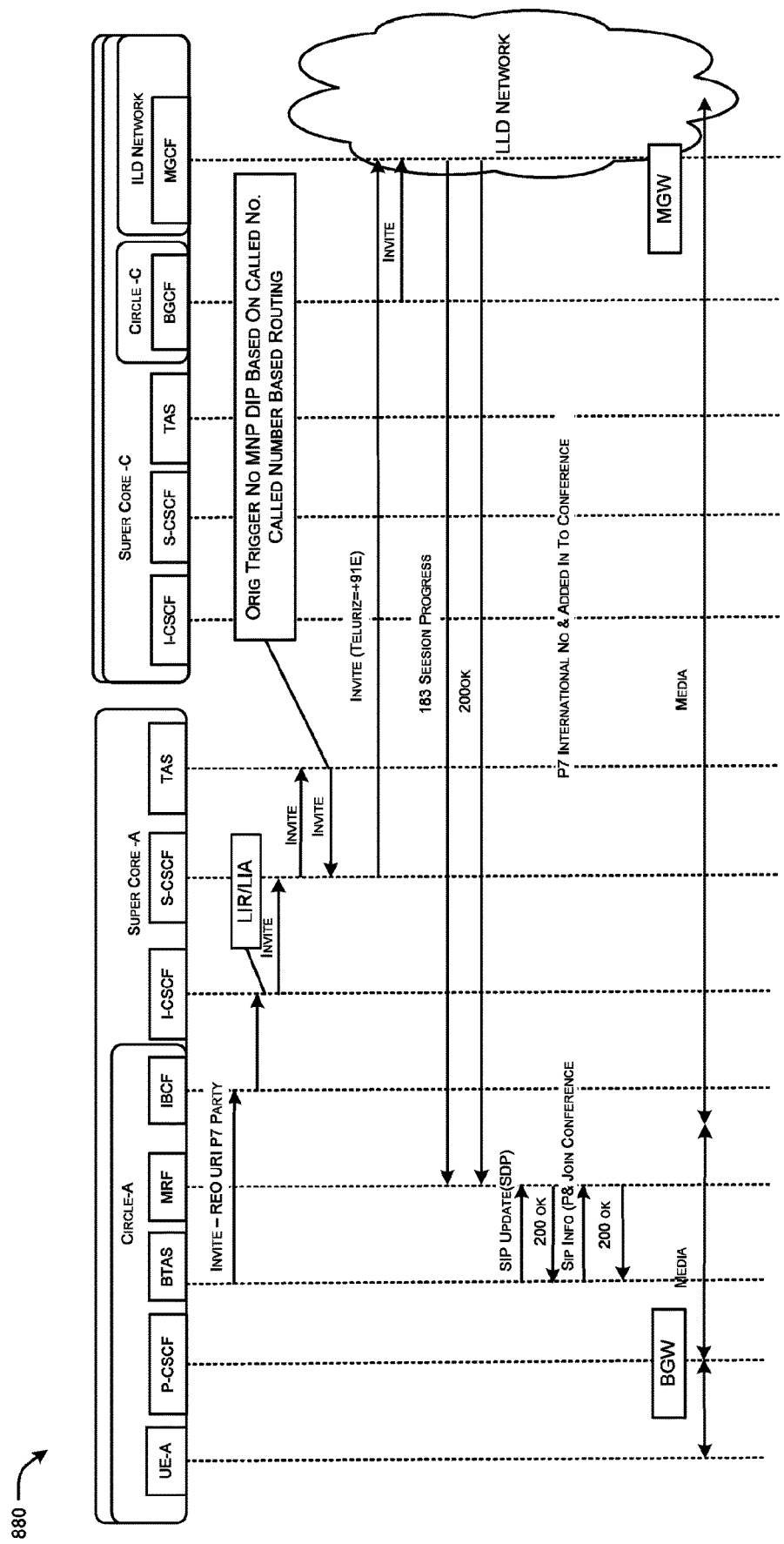

In an embodiment and as shown in 880 in FIG. 8G, the concurrent communication may be established between user device (UE-A) and entity device (UE-B). Similar to FIG. 8A, the user device (UE-A) 110 may correspond to user A who may initiate and/or control aspects of the concurrent communication in a home circle (Circle-A) within a cluster or super-core A. However, the user B or entity B in this example may be a participating in the concurrent communication using the entity device (UE-B) and may pertain to international subscriber or service i.e. international long distance (ILD) service. The illustration in FIG. 8G indicate steps involved in establishing the concurrent communication, which may be similar as shown in FIG. 8A, except that the invite may be routed from IMS network based on MSISDN of entity B or B-Party device. In this example, the communication may be routed from IMS to an ILD network and further routing may be done based on corresponding ILD routing policy. Further, as the communication may be an international communication, the charges may be in accordance with A-Party as per conference charging policy. Various other aspects may be possible within the scope of the present disclosure. It may be appreciated that although only one participating entity B may be shown for simplicity, but the same steps may be applicable in case of other participating entities (similar to participant B) in concurrent communication.

Figure 9A:
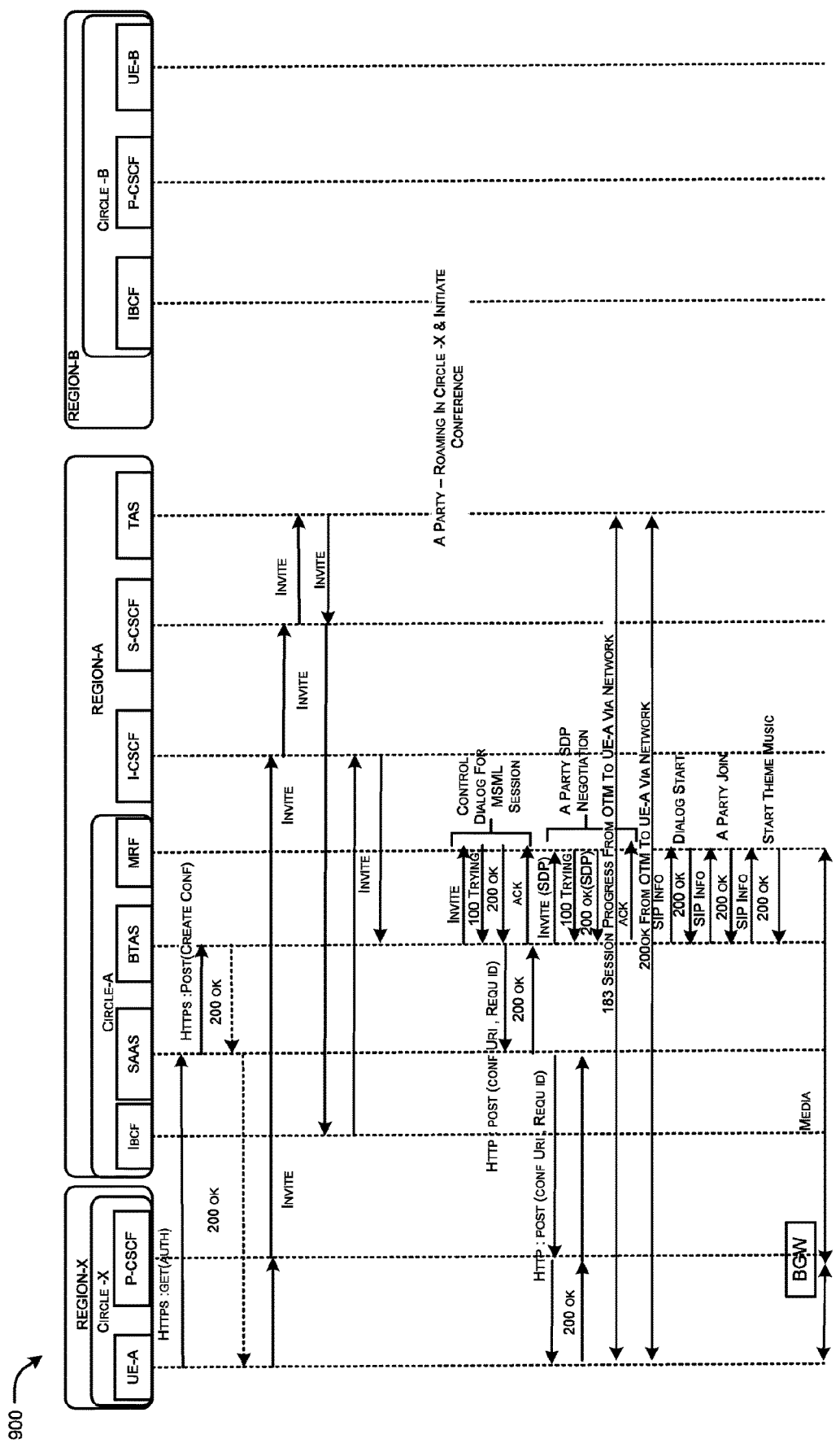
FIGS. 9A-9B illustrate exemplary representations showing various scenarios pertaining to a user initiating a concurrent communication, in accordance with an embodiment of the present disclosure.
Figure 9B:
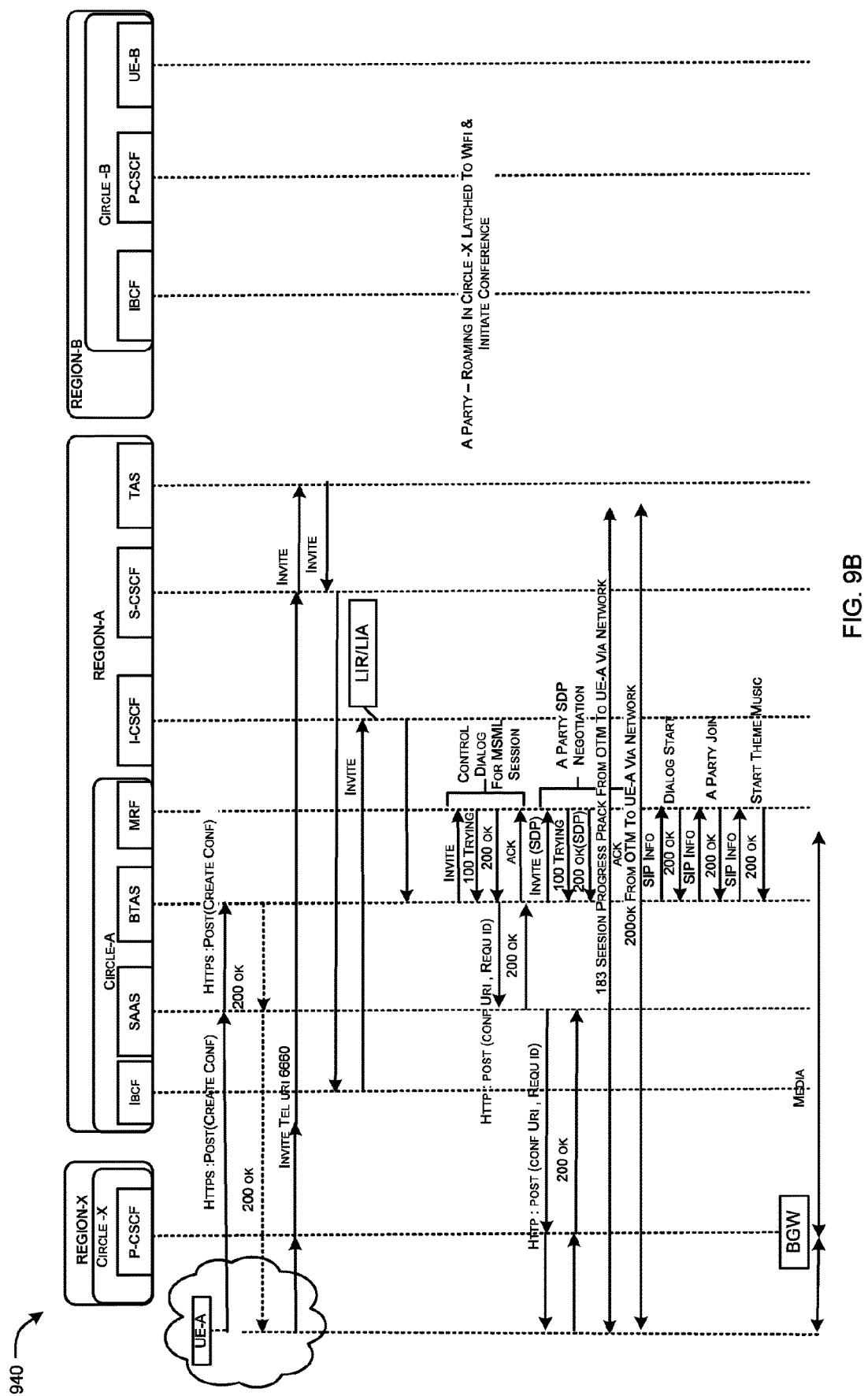

FIGS. 9A-9B illustrate exemplary representations 900 and 940, respectively showing various scenarios pertaining to a user initiating a concurrent communication, in accordance with an embodiment of the present disclosure. In an embodiment and as shown in 900 in FIG. 9A, the concurrent communication may be established between user device (UE-A) and entity device (UE-B). In FIG. 9A, the user device (UE-A) may correspond to user A who may initiate and/or control aspects of the concurrent communication. In FIG. 9A, the user device (UE-A) may be roaming in circle X and may be latched to IMS network at the time of initiating the concurrent communication. In another embodiment and as shown in FIG. 9B, the user device (UE-A) may be roaming in circle X, except that the user device (UE-A) may be latched to a wireless network protocol such as WIFI at the time of initiating the concurrent communication. In both cases as shown in FIGS. 9A-9B, the user B or entity B may be a participating in the concurrent communication using the entity device (UE-B) and may pertain to a different circle as that of user A device (UE-A) i.e. Circle-B. The illustration in FIGS. 9A indicate steps involved in establishing the concurrent communication. For example, as shown in FIG. 9A, the communication may be a communication call originating from user A device (UE-A) to SAAS gateway though corresponding DNS. Further in both examples as covered in FIGS. 9A and 9B, an invite may be sent to BTAS, wherein the communication call may be answered after establishing a session with MRF and the user device (UE-A). In an example, the user A may hear a default theme music on the user device (UE-A) upon initiation of the communication call such that the default theme music may continue until a message such as "200 OK" may be received from any one of the participating entities (entity B in this case). In an example embodiment, if the participating entity B may not answer the call, a timeout may occur and resource may be released. In an example, a pre-defined time duration may be set for the timeout. In an alternate example embodiment, in case if the communication call request may not be answered by all the participating entities, then the A-Party or user A may be able to customize corresponding charges based on pre-determined policy. Various other aspects may be possible within the scope of the present disclosure. It may be appreciated that although only one participating entity B may be shown for simplicity, but the same steps may be applicable in case of other participating entities in concurrent communication.

FIG. 10 illustrates an exemplary representation of flow diagram 1000 for facilitating a user device to establish concurrent communication with plurality of participating entities, in accordance with an embodiment of the present disclosure. The flow diagram 1000 may represent a general sequence of steps in case of outgoing communication or incoming communication. At 1002, the method may include a step of authenticating a user device. At 1004, an input information may be received from the authenticated user device. At 1006, the method may include a step of transmitting input information through an external server to a network device. At 1008, the method may include a step of establishing the concurrent communication between the user device and the plurality of entities. In an example embodiment, an external server (SAAS gateway) may perform authentication of the user device and/or the application on the user device, prior to receiving input information and/or communication request. In an example embodiment, the authentication may be performed through a password based authentication such as, for example, one-time password (OTP) based authentication technique. In an embodiment, the OTP authentication may be performed via interfacing with short message service center (SMSC), which may be operational with the SAAS gateway via known protocol such as, Short Message Peer-to-Peer (SMPP). In an example, the SMSC may assist in generation and/or verification of OTP messages, which may be used for verification of the user device running the application. It may be appreciated that the authentication may not be limited to the mentioned technique and various other mechanisms are also possible within the scope of the present disclosure. In an example embodiment, a network device or BTAS may receive the input information such as, for example, list of participating entities, conference request actions (for example, add/delete/mute/unmute related actions). For example, the BTAS may handle conference participant list and/or status notification with user device application on RESTful interface as received via SAAS gateway. The SAAS gateway may manage web socket connection with user device and enables to convert received request to HTTP/Rest and further sends to BTAS. In an example, the network device or BTAS may include an application for concurrent communication that may be executed along with general BTAS application in payload blades. For example, the application may evaluate and understand received request from user device and initiate calls towards participants on behalf of user, for example via VOLTE TAS. The input information may be received at the external server (SAAS gateway) from the user device application through web sockets via F5. The received information may be forwarded towards subscriber home circle BTAS (for example, on RESTful). F5 may be a load balancer that may be used to receive the request from user device application on web-socket and forward it to available SAAS gateway, wherein once the SAAS gateway may process the request and forward it to user device application, it may be sent to F5. In an example, F5 may check the request and identify the available BTAS application and forward based on equal distribution. Various other protocols may be used within the scope of the present disclosure. The concurrent communication can thus allow to establish the conference call, without the need to sequentially add the participating entities. This may reduce conference establishing time considerably and may also enable to optimize the effective usage of communication time.

Figure 11:
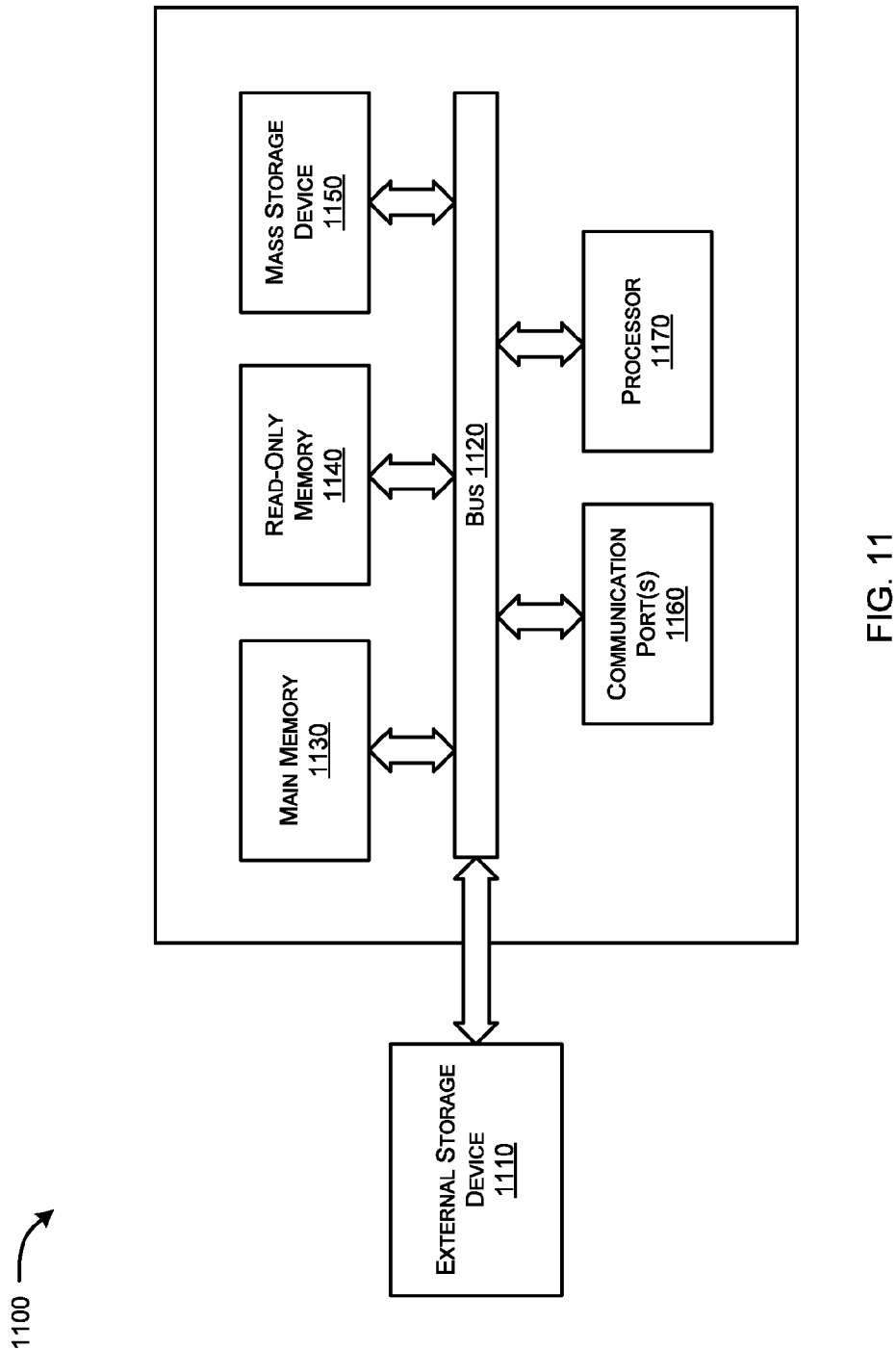
FIG. 11 illustrates an exemplary computer system in which or with which embodiments of the present invention can be utilized in accordance with embodiments of the present disclosure.

FIG. 11 illustrates an exemplary computer system in which or with which embodiments of the present invention can be utilized in accordance with embodiments of the present disclosure. As shown in FIG. 11, computer system 1100 can include an external storage device 1110, a bus 1120, a main memory 1130, a read only memory 1140, a mass storage device 1150, communication port 1160, and a processor 1170. A person skilled in the art will appreciate that the computer system may include more than one processor and communication ports. Processor 1170 may include various modules associated with embodiments of the present invention. Communication port 1160 can be any of an RS-232 port for use with a modem based dialup connection, a 10/100 Ethernet port, a Gigabit or 10 Gigabit port using copper or fibre, a serial port, a parallel port, or other existing or future ports. Communication port 1160 may be chosen depending on a network, or any network to which computer system connects. Memory 1130 can be Random Access Memory (RAM), or any other dynamic storage device commonly known in the art. Read-only memory 1140 can be any static storage device(s). Mass storage 1150 may be any current or future mass storage solution, which can be used to store information and/or instructions.

Bus 1120 communicatively couples processor(s) 1170 with the other memory, storage and communication blocks.

Optionally, operator and administrative interfaces, e.g. a display, keyboard, and a cursor control device, may also be coupled to bus 1120 to support direct operator interaction with a computer system. Other operator and administrative interfaces can be provided through network connections connected through communication port 1160. Components described above are meant only to exemplify various possibilities. In no way should the aforementioned exemplary computer system limit the scope of the present disclosure.

It would be appreciated that the embodiments herein are explained with respect to network device or BTAS, however, the proposed system and method can be implemented in any computing device or external devices without departing from the scope of the invention. The present disclosure may pertain to 3GPP specifications such as for example, 3GPP TS 29.198-04-5, version 9.0.0. Release 9.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Present Disclosure

The present disclosure provides a system and a method to facilitate an effective, concurrent and improved communication with multiple participating entities.

The present disclosure provides an economical and next generation based system and a method that can eliminate the need for sequentially adding each participating entity in a concurrent communication, thus making the process less tedious and more user-friendly.

The present disclosure provides a system and a method that enables the participating entities to join the conference communication or call while avoiding the need for installation of an application/utility software in corresponding devices of the participating entities. This greatly reduces dependency of establishing the conference communication and facilitates to explore mass usage potential and utility of conference application.

The present disclosure provides a system and a method that can enable an instant communication with multiple contacts irrespective of the location of the user and/or participating entity.

We claim:

1. A system for facilitating a user device to establish communication of a user device with a plurality of participating entities, the system comprising:
a network device associated with a service provider that provides a network service to the user device, wherein the network device is communicatively coupled to the plurality of participating entities, wherein said network device comprises one or more processors coupled with a memory, and wherein the memory stores instructions which when executed by the one or more processors causes the system to:
receive, through an Internet Protocol Multimedia Subsystem (IMS) server communicably operational with a server associated with the network device, a routed request that is derived based on an original request from the user device, wherein the original request indicates a requirement to establish a conference communication with the plurality of participating entities;
extract, based on the received routed request, a first set of attributes pertaining to a list of pre-stored contact numbers pertaining to the plurality of participating entities;
extract, based on the received routed request, a second set of attributes pertaining to a combination of an input information and one or more desired actions to be implemented associated with the input information; and
invoke, based on the extracted first and second set of attributes, a call leg to initiate a concurrent communication with the plurality of participating entities, wherein, based on the invoked call leg, the IMS server establishes the concurrent communication of the user device with the plurality of participating entities simultaneously.

2. The system as claimed in claim 1, wherein a user is able to access a set of executable instructions that is installed in the user device to enable the user device to send any or a combination of the input information and the original request through a predefined medium.

3. The system as claimed in claim 2, wherein the network device is configured to send a status notification to the set of executable instructions on the user device via the server.

4. The system as claimed in claim 1, wherein the system is configured to authenticate the user device through the server, prior to receiving any or a combination of the input information and the original request.

5. The system as claimed in claim 1, wherein the system is configured to establish the concurrent communication between the user device and the plurality of participating entities simultaneously to avoid sequential establishment of the concurrent communication.

6. The system as claimed in claim 1, wherein the system is configured to enable a user to customize one or more features of the concurrent communication, the one or more features including any or a combination of addition or removal of one or more participating entities, muting or unmuting the one or more participating entities, creating or scheduling ad-hoc communication, and obtaining status of each of said one or more participating entities in the concurrent communication.

7. The system as claimed in claim 1, wherein the system is configured to obtain a status of a plurality of entity devices corresponding to the subscribed plurality of participating entities prior to the initiation of the concurrent communication, and wherein the status of the plurality of entity devices corresponding to the subscribed plurality of participating entities is indicative of availability of the subscribed plurality of participating entities prior to the initiation of the concurrent communication.

8. The system as claimed in claim 1, wherein one or more participating entities of the plurality of participating entities are associated with a different service provider, and wherein the system is configured to establish the concurrent communication with the one or more participating entities associated with the different service provider.

9. The system as claimed in claim 1, wherein the system is configured to establish a communication between the user device and a single entity.

10. The system as claimed in claim 1, wherein the system is configured to establish the concurrent communication in case of any or a combination of a scheduled communication or a dynamic call, wherein the scheduled communication pertains to a communication scheduled in advance, and wherein the dynamic call pertains to randomly established communication without prior planning.

11. The system as claimed in claim 1, wherein the system is configured to connect the user device with respective entity devices of the plurality of participating entities through a conference communication call comprising at least one of an audio call, a video call, or combination thereof.

12. The system as claimed in claim 1, wherein the system is configured to facilitate the concurrent communication through exchange of communication data comprising at least one of a textual data, a video data, and an audio data.

13. The system as claimed in claim 1, wherein the network device is configured to handle functions pertaining to service charging.

14. A user equipment (UE) for establishing a communication with a plurality of participating entities, the UE comprising:
a processor associated with a service provider that provides a network service to the UE, wherein the UE is communicatively coupled to the plurality of participating entities, and wherein the processor is coupled with a memory, the memory storing instructions which when executed by the processor causes the UE to:
initiate a concurrent communication with the plurality of participating entities by sending an original request, wherein the original request indicates a requirement to establish a conference communication with the plurality of participating entities;
in response to the initiation of the concurrent communication, receive, through an Internet Protocol Multimedia Subsystem (IMS) server communicably operational with a server associated with the UE, a routed request that is derived based on the original request from the UE;

extract, based on the received routed request, a first set of attributes pertaining to a list of pre-stored contact numbers pertaining to the plurality of participating entities;

extract, based on the received routed request, a second set of attributes pertaining to a combination of an input information and one or more desired actions to be implemented associated with the input information; and invoke, based on the extracted first and second set of attributes, a call leg to initiate a concurrent communication with the plurality of participating entities, wherein, based on the invoked call leg, the IMS server establishes the concurrent communication of the user device with the plurality of participating entities simultaneously.

15. The UE as claimed in claim 14, wherein the concurrent communication is initiated by using a set of executable instructions on the UE.

16. The UE as claimed in claim 15, wherein the set of executable instructions on the UE is used to send a conference communication request along with the input information to the server, which is forwarded to a network device for establishing the concurrent communication.

17. A method for facilitating a user device to establish communication with a plurality of participating entities, the method comprising:

receiving, by a network device, through an Internet Protocol Multimedia Subsystem (IMS) server communicably operational with a server associated with the network device, a routed request that is derived based on an original request from the user device, wherein the original request indicates a requirement to establish a conference communication with the plurality of participating entities, wherein the network device is associated with a service provider that provides a network service to the user device, wherein the network device is communicatively coupled to the plurality of participating entities, wherein said network device comprises one or more processors coupled with a memory, and wherein the memory stores instructions executed by the one or more processors;

extracting, by the network device, based on the received routed request, a first set of attributes pertaining to a list of pre-stored contact numbers pertaining to the plurality of participating entities;

extracting, by the network device, based on the received routed request, a second set of attributes pertaining to a combination of an input information and one or more desired actions to be implemented associated with the input information; and invoking, by the network device, based on the extracted first and second set of attributes, a call leg to initiate a concurrent communication with the plurality of participating entities, wherein, based on the invoked call leg, the IMS server establishes the concurrent communication of the user device with the plurality of participating entities simultaneously.

18. The method as claimed in claim 17, wherein a user is able to access a set of executable instructions that is installed in the user device to enable the user device to send any or a combination of the input information and the original request through a predefined medium.

19. The method as claimed in claim 18, wherein the network device is configured to send a status notification to the set of executable instructions on the user device via the server.

20. The method as claimed in claim 17, wherein the method comprises th step of: authenticating the user device through the server prior to receiving any or a combination of the input information and the original request.

21. The method as claimed in claim 17, wherein the method comprises the step of: establishing the concurrent communication between the user device and the plurality of participating entities simultaneously to avoid sequential establishment of the concurrent communication.

22. The method as claimed in claim 17, wherein the method comprises the step of: enabling a user to customize one or more features of the concurrent communication, the one or more features including any or a combination of addition or removal of one or more participating entities, muting or unmuting the one or more participating entities, creating or scheduling ad-hoc communication, and obtaining status of each of said one or more participating entities in the concurrent communication.

23. The method as claimed in claim 17, wherein the method comprises the step of: enabling a user to customize one or more features of the concurrent communication, the one or more features including any or a combination of addition or removal of one or more participating entities, muting or unmuting the one or more participating entities, creating or scheduling ad-hoc communication, and obtaining status of each of said one or more participating entities in the concurrent communication.

24. The method as claimed in claim 17, wherein one or more of participating entities of the plurality of participating entities are associated with a different service provider, and wherein the method comprises establishing the concurrent communication with the one or more participating entities associated with the different service provider.

25. The method as claimed in claim 17, wherein the method comprises the step of: establishing a communication between the user device and a single entity.

26. The method as claimed in claim 17, wherein the method comprises the step of: establishing the concurrent communication in case of any or a combination of a scheduled communication or a dynamic call, wherein the scheduled communication pertains to a communication scheduled in advance, and wherein the dynamic call pertains to randomly established communication without prior planning.

27. The method as claimed in claim 17, wherein the method comprises the step of: connecting the user device with respective entity devices of the plurality of participating entities through a conference communication call comprising at least one of an audio call, a video call, or combination thereof.

28. The method as claimed in claim 17, wherein the method comprises the step of: facilitating the concurrent communication through exchange of communication data comprising at least one of a textual data, a video data, and an audio data.

29. The method as claimed in claim 17, wherein the network device is configured to handle functions pertaining to service charging.

30. A non-transitory computer readable medium comprising machine executable instructions that are executable by a processor to:

receive, through an Internet Protocol Multimedia Subsystem (IMS) server communicably operational with a server associated with a network device operatively coupled to the non-transitory computer readable medium, a routed request that is derived based on an original request from a user device, wherein the original request indicates a requirement to establish a conference communication with a plurality of participating entities, wherein the network device is associated with a service provider that provides a network service to the user device, and wherein the network device is communicatively coupled to the plurality of participating entities;

extract, based on the received routed request, a first set of attributes pertaining to a list of pre-stored contact numbers pertaining to the plurality of participating entities;

extract, based on the received routed request, a second set of attributes pertaining to a combination of an input information and one or more desired actions to be implemented associated with the input information; and invoke, based on the extracted first and second set of attributes, a call leg to initiate a concurrent communication with the plurality of participating entities wherein, based on the invoked call leg, the IMS server establishes the concurrent communication of the user device with the plurality of participating entities simultaneously.

* * * * *